United States Patent
Cheng et al.

(10) Patent No.: US 11,822,745 B2
(45) Date of Patent: Nov. 21, 2023

(54) DRIVING METHOD OF ACTIVE STYLUS AND RELATED DRIVING DEVICE

(71) Applicant: NOVATEK MICROELECTRONICS CORP., Hsinchu (TW)

(72) Inventors: Hao-Wei Cheng, Tainan (TW); Cheng-Wei Pan, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 17/891,628

(22) Filed: Aug. 19, 2022

(65) Prior Publication Data
US 2023/0140181 A1 May 4, 2023

Related U.S. Application Data

(60) Provisional application No. 63/235,127, filed on Aug. 19, 2021.

(51) Int. Cl.
*G06F 3/041* (2006.01)
*G06F 3/044* (2006.01)
*G06F 3/0354* (2013.01)

(52) U.S. Cl.
CPC ........ *G06F 3/0418* (2013.01); *G06F 3/03545* (2013.01); *G06F 3/0441* (2019.05); *G06F 3/0442* (2019.05); *G06F 3/04166* (2019.05)

(58) Field of Classification Search
CPC .. G06F 3/0418; G06F 3/04166; G06F 3/0441; G06F 3/0442; G06F 3/03545
See application file for complete search history.

(56) References Cited

U.S. PATENT DOCUMENTS

| | | | |
|---|---|---|---|
| 2016/0266673 | A1 | 9/2016 | Dinu et al. |
| 2019/0171320 | A1* | 6/2019 | Kim ........... G06F 3/0443 |

FOREIGN PATENT DOCUMENTS

| | | |
|---|---|---|
| CN | 106484178 B | 3/2017 |
| CN | 110892368 A | 3/2020 |
| CN | 111090352 A | 5/2020 |
| CN | 111427463 A | 7/2020 |

* cited by examiner

*Primary Examiner* — Lisa S Landis
(74) *Attorney, Agent, or Firm* — MARSHALL, GERSTEIN & BORUN LLP

(57) ABSTRACT

Provided are a driving method of a touch display panel, a driving circuit and a touch display device. The driving method includes: obtaining a touch position of an active stylus; determining a first region on the touch display panel based on the touch position of the active stylus; and transmitting an uplink (UL) signal to touch sensing electrodes in the first region and transmitting an anti-interference signal to the touch sensing electrodes in at least a part of the region except for the first region on the touch display panel during an UL transmission period, wherein the UL signal transmitted to the touch sensing electrodes in the first region during the UL transmission period is for transmission to the active stylus.

25 Claims, 15 Drawing Sheets

DRIVING METHOD OF ACTIVE STYLUS AND RELATED DRIVING DEVICE

TECHNICAL FIELD

The present disclosure relates to the field of touch technology, more particularly, to a driving method of a touch display panel, a driving circuit and a touch display device.

BACKGROUND

In the prior art, a user may manipulate the touch display device through fingers or an input device.

An active stylus is an input device commonly used for interacting with the touch display device. The touch display panel in the touch display device includes a display panel and a touch sensor, and the touch sensor includes a plurality of touch sensing electrodes and may be integrated in the display panel structure (in-cell) or provided on the display panel as a separate touch panel (on-cell), and the touch sensor may sense both finger touch and active stylus touch. The touch sensing circuit may be an independent circuit or integrated with the display driving circuit, for example, the touch sensing circuit may be integrated into a touch sensing chip, or integrated into a display and touch driving chip (also referred to as TDDI (Touch and Display Driver Integrated) chip) together with the display driver circuit.

At present, the active stylus on the market has the function of bidirectional communication. The active stylus and the touch display panel may communicate bi-directionally through Uplink/Downlink (UL/DL) signals, providing users with more support and convenience. The bidirectional communication provided by the active stylus includes, for example, the TDDI chip transmitting UL signals and the active stylus transmitting DL signals. The UL signals carry commands (which have been encoded) that the TDDI chip intends to transmit to the active stylus, and the DL signals carry commands (which have been encoded) that the active stylus intends to transmit to the TDDI chip. As shown in FIG. 1A, when the active stylus approaches or contacts the touch display panel, the active stylus receives a UL signal and responds, for example, the active stylus switches mode and sets frequency. As shown in FIG. 1B, when the active stylus is hovering over and approaches such that a DL signal with sufficient energy (intensity) may be received by the driving circuit, the driving circuit may calculate the current touch position of the active stylus. When the active stylus transmits a DL signal, the capacitance value of a touch sensing electrode changes accordingly. During the DL transmission, for example, an analog front end (AFE) in the TDDI chip receives the DL signal from the touch sensing electrode, and a processor in the TDDI chip may determine the touch position of the active stylus after preliminary process, and provide the touch position to, for example, the core processor of the touch display device, such as a mobile phone or tablet. Meanwhile, the TDDI chip also decodes the received DL signal to obtain the commands transmitted from the active stylus to the TDDI chip.

However, as the size of the touch display panel gradually increases, other body parts of the user (for example, the palm or fingers of the other hand) except for the hand holding the stylus are more likely to touch the touch display panel at the same time. Based on the physical characteristics that the human body is a conductor, when the user uses the active stylus, the UL signal transmitted from the TDDI chip through the touch sensing electrodes will not only be received by the active stylus, but also received by the other body parts of the user and transmitted to the stylus shell (generally used as a ground terminal) of the active stylus, which may be an interference for the uplink signals received by the active stylus, and may even interrupt the uplink transmission in severe cases.

SUMMARY

The embodiments of the present disclosure provide a driving method of a touch display panel, a driving circuit and a touch display device which are capable of reducing the intensity of the UL signal conducted to the active stylus from the other body parts of the user (for example, the palm), thereby increasing the signal-to-noise ratio of the UL signal received by the active stylus to ensure the normal operation of the active stylus.

According to an aspect of the present disclosure, a driving method of a touch display panel including a plurality of touch sensing electrodes is provided, the driving method comprises: obtaining a touch position of an active stylus; determining a first region on the touch display panel based on the touch position of the active stylus; and transmitting an uplink (UL) signal to touch sensing electrodes in the first region and transmitting an anti-interference signal to touch sensing electrodes in at least a part of the region except for the first region on the touch display panel, during an UL transmission period, wherein the UL signal transmitted to the touch sensing electrodes in the first region during the UL transmission period is for transmission to the active stylus.

According to another aspect of the present disclosure, a driving method of a touch display panel including a plurality of touch sensing electrodes is provided, the driving method comprises: obtaining a touch position of human body; determining a touch region of the human body on the touch display panel based on the touch position of human body; and transmitting an uplink (UL) signal to touch sensing electrodes in the touch region of the human body and transmitting an anti-interference signal to touch sensing electrodes in at least a part of region except for the touch region of the human body on the touch display panel, during an UL transmission period, wherein the UL signal transmitted to the touch sensing electrodes in the touch region of the human body during the UL transmission period is for transmission to the active stylus through human body.

According to another aspect of the present disclosure, a driving circuit of a touch display panel including a plurality of touch sensing electrodes is provided, the driving circuit comprises: a signal generating module configured to generate an uplink (UL) signal and an anti-interference signal, wherein the UL signal or the anti-interference signal is selectively transmitted to each of the plurality of touch sensing electrodes during an uplink (UL) transmission period; a touch sensing module configured to receive a downlink (DL) signal from the plurality of touch sensing electrodes during a DL transmission period of an active stylus, wherein the DL signal is used to determine a touch position of the active stylus; and a control module configured to: obtain the touch position of the active stylus; determine a first region on the touch display panel based on the touch position of the active stylus; and perform control such that the UL signal is transmitted to touch sensing electrodes in the first region and the anti-interference signal is transmitted to touch sensing electrodes in at least a part of region except for the first region on the touch display panel during the UL transmission period, wherein the UL signal transmitted to the touch sensing electrodes in the first region during the UL transmission period is for transmission to the active stylus.

According to another aspect of the present disclosure, a driving circuit of a touch display panel including a plurality of touch sensing electrodes, the driving circuit comprises: a signal generating module configured to generate an uplink (UL) signal, an anti-interference signal and touch excitation signal; a touch sensing module configured to transmit a touch excitation signal to the plurality of touch sensing electrodes during a touch detection period and receive sensed signals therefrom, wherein the sensed signals are used to determine a touch position of human body; and a control module configured to: obtain the touch position of human body; determine a touch region of the human body on the touch display panel based on the touch position of human body; and perform control such that an uplink (UL) signal is transmitted to touch sensing electrodes in the touch region of the human body and an anti-interference signal is transmitted to touch sensing electrodes in at least a part of region except for the touch region of the human body on the touch display panel, during an UL transmission period, wherein the UL signal transmitted to the touch sensing electrodes in the touch region of the human body during the UL transmission period is for transmission to the active stylus through human body.

According to another aspect of the present disclosure, a touch display device is provided, the touch display device comprises: a touch display panel including a plurality of touch sensing electrodes, which are used to perform touch sensing during a touch detection period, to transmit a uplink (UL) signal to an active stylus during an UL transmission period and receive a downlink (DL) signal from the active stylus during a DL period of the active stylus; and a drive circuit as described above.

In various embodiments of the present disclosure, by transmitting the anti-interference signal to at least the touch sensing electrodes in the region where a UL interference signal may be conducted to the active stylus (e.g., the region corresponding to the touch position of human body), the intensity of the UL interference signal conducted to the active stylus may be reduced, thereby the sensing effect of the active stylus may be improved.

DETAILED DESCRIPTION OF THE EMBODIMENTS

Figure 1A:
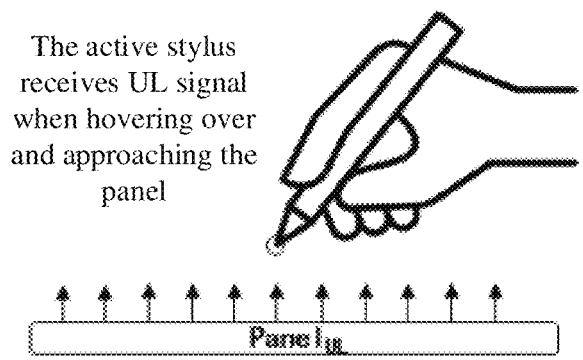
FIGS. 1A-1B illustrate a schematic diagram of the bidirectional communication process between the active stylus and the touch display panel.
Figure 1B:
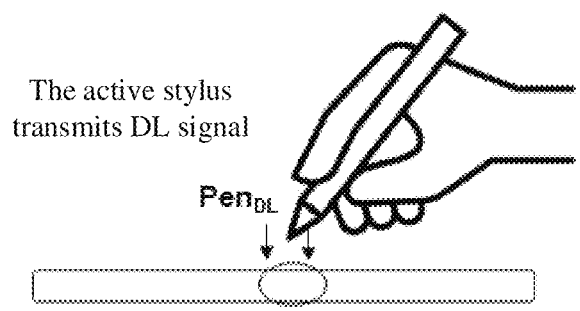

In order to make the objects, technical solutions and advantages of the embodiments of the present disclosure more clear, the technical solutions of the embodiments of the present disclosure will be clearly and fully described below in conjunction with the accompanying drawings. Apparently, the described embodiments are part of embodiments of the present disclosure, but not all. Based on the described embodiments of the present disclosure, all other embodiments obtained by those ordinary skilled in the art without inventive efforts fall within the protection scope of the present disclosure.

Unless otherwise defined, technical or scientific terms used in this disclosure shall have the ordinary meaning as understood by one of ordinary skilled in the art to which this disclosure belongs. Terms such as "first", "second" and similar words used in this disclosure do not denote any order, quantity, or importance, but are merely used to distinguish the various components. Likewise, terms such as "a" "an" or "the" do not denote a limitation of quantity, but denote the presence of at least one. An expression in singular may include an expression in plural, and an expression in plural may also include an expression in singular, unless defined in the context clearly. "Comprises" or "includes" and similar words mean that the components or objects appearing before the word encompass the listed components or objects appearing after the word and their equivalents, but do not exclude other components or objects.

Further, elements/components/steps with the same reference numerals represent the same or similar parts in the figures and embodiments. Elements/components/steps with the same reference numerals in different embodiments may refer to the relevant description.

Figure 2:
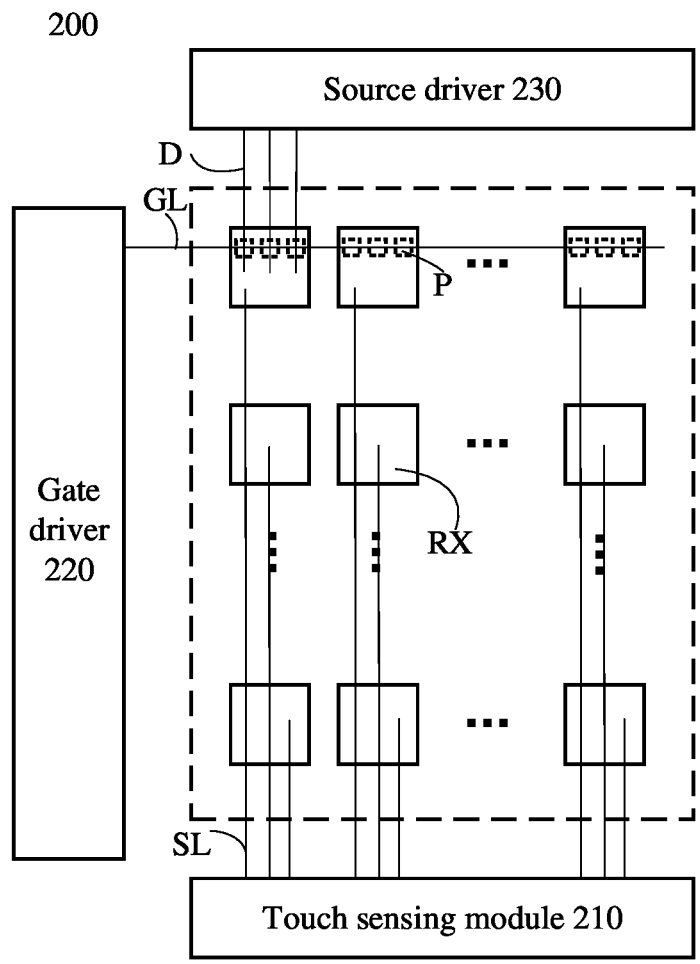
FIG. 2 is a schematic diagram of a touch display device 200 according to the embodiments of the present disclosure.

FIG. 2 is a schematic diagram of a touch display device 200 according to the embodiments of the present disclosure.

Figure 3:
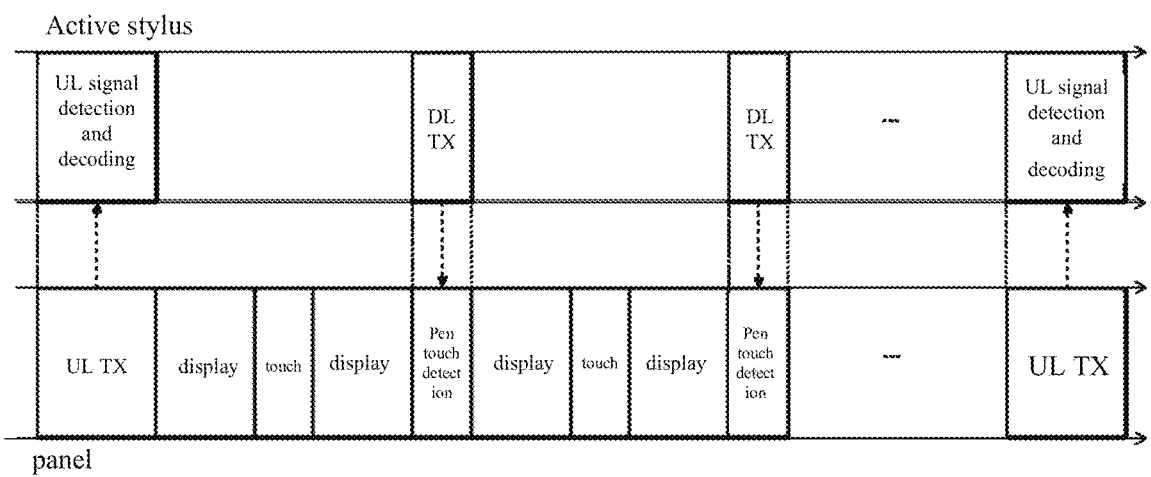
FIG. 3 is a schematic timing diagram corresponding to the touch display device 200 shown in FIG. 2.

FIG. 3 is a schematic timing diagram corresponding to the touch display device 200 shown in FIG. 2.

Referring to FIG. 2, the touch display device 200 includes a driving circuit (e.g., a touch and display driver integration (TDDI) circuit) and a touch display panel. The touch display panel includes a plurality of pixel structures P in the display area. In the touch display panel, the touch sensor and the display panel may be integrated together in an in-cell manner or an on-cell manner. The touch sensor includes a plurality of touch sensing electrodes RX, for example, touch sensing electrodes RX arranged in an array. The driving circuit may include a touch sensing module 210, a gate driver 220, a source driver 230, and the like. Alternatively, the gate driver 210 and/or the source driver 230 may also be arranged outside the driving circuit, for example, arranged on the touch display panel. In the present disclosure, the horizontal direction of the array of touch sensing electrodes shown in FIG. 2 is determined as the row direction, and the vertical direction thereof is determined as the column direction, but those skilled in the art would know that the determination of the row and column directions may be reversed.

The touch display device 200 also includes sensing lines SL, gate lines GL and data lines D. The touch sensing electrodes RX are electrically insulated from each other, and are electrically connected to the touch sensing module 210 through the sensing lines SL. Each gate line GL is connected to the gate driver 220 and to the gate of the thin film transistor in its corresponding pixel structure P. Each data line D is connected to the source driver 230 and to the source of the thin film transistor in its corresponding pixel structure P. The drain of the thin film transistor is connected to the pixel electrode. For simplicity, not all circuits (e.g., a timing controller, a signal generating module, etc.) are shown in FIG. 2, and thus the above driving circuit may also include other components.

Whether each touch sensing electrode RX is touched is determined by a self-capacitance sensing method during the touch detection period. Specifically, the touch sensing module 210 may transmit a touch excitation signal to a touch sensing electrode RX through the sensing line SL, and receive, through the sensing line SL, a sensed signal, which may reflect whether the capacitance value on the touch sensing electrode RX connected to the sensing line SL changes, so as to determine whether a touch event occurs; in addition, during sensing the touch of the active stylus, when the active stylus transmits the downlink (DL) signal during the DL transmission period of the active stylus, the capacitance value of the touch sensing electrode also changes. Therefore, the touch sensing module 210 receives the DL signal to determine the touch position of the active stylus. Since the duration of the DL transmission period is short, the process of determining the touch position of the active stylus may not be performed during the DL signal transmission.

In order to determine touch position of human body/the active stylus, the touch sensing module 210 may further include an analog front end, a multiplexer, and/or an integrator, etc., while the driving circuit of the embodiments of the present disclosure may also include more circuit components. The structure of an exemplary touch sensing module 210 will be described later.

As shown in FIG. 3, a timing diagram in a predetermined time period for the touch display device of FIG. 2 is illustrated, and the predetermined time period may have a time length of one display frame or have other time lengths. The predetermined time period may be divided into at least one UL transmission period (i.e., the UL detection or decoding period of the active stylus), at least one display period, at least one touch detection period, and at least one stylus touch detection period (i.e., DL transmission period of the active stylus), which do not overlap with each other and may be set alternately.

During each UL transmission period, the driving circuit transmits the UL signal to be transmitted to the active stylus through the plurality of touch sensing electrodes; during each display period, the driving circuit drives the touch display device to display image; during each touch detection period, the driving circuit drives the touch display device to perform touch detection (human touch) on at least a part of the touch sensing electrodes; during each stylus touch detection period, the driving circuit receives the DL signal transmitted from the active stylus through the touch sensing electrodes, wherein the DL signal transmitted from the active stylus is generated in response to the UL signal received from the touch sensing electrodes during the previous UL transmission period.

Alternatively, the UL signal may be a variable signal which is capable of carrying information and may have any suitable waveform such as a square wave, a triangle wave, a sine wave, and the like.

As described above, if the UL signal received by the active stylus is interfered by the signal transmitted from the human body such as the palm, the DL signal generated by the active stylus may be wrong, or the active stylus may fail to generate the DL signal.

Figure 4A:
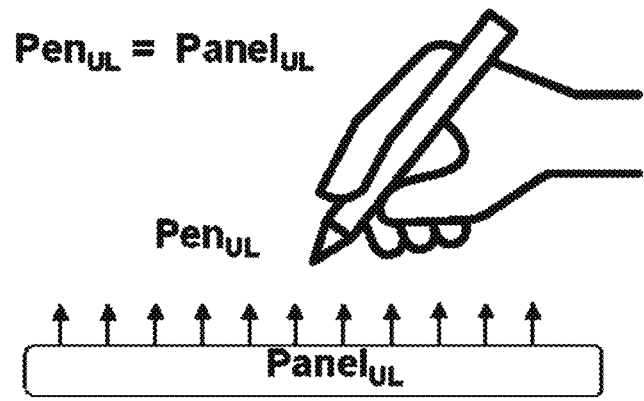
FIGS. 4A-4B are schematic diagrams illustrating the influence on the intensity of the UL signal received by the active stylus when the human body touches the touch display panel.
Figure 4B:
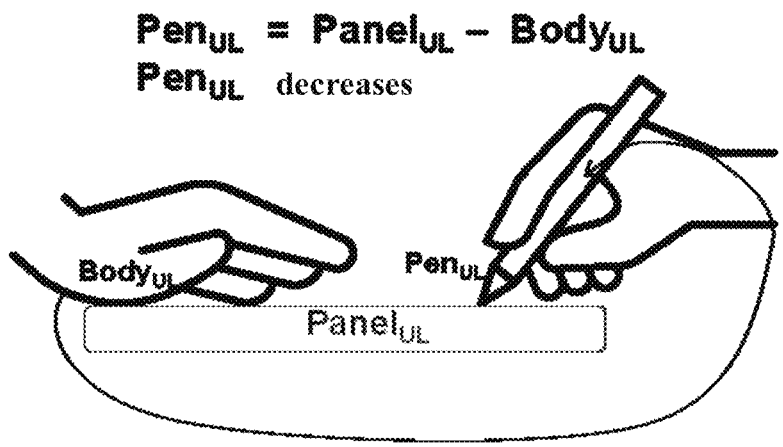

FIGS. 4A-4B are schematic diagrams illustrating the influence on the intensity of the UL signal received by the active stylus when the user's palm, which is not a part of the hand holding the active stylus, touches the touch display panel.

As shown in FIG. 4A, when the user's palm, which is not any part of the hand holding the active stylus, does not approach or contact (collectively referred to as touch) the touch display panel, the UL signal shown as $Pen_{UL}$ received by the active stylus is basically the same as the UL signal shown as $Panel_{UL}$ transmitted from the touch sensing electrodes (hereinafter, also the UL signal transmitted from e.g., the driving circuit to the touch sensing electrodes). In the present disclosure, increasing the number of the touch sensing electrodes (e.g., the number of columns of the touch sensing electrodes RX) is beneficial for increasing the intensity of the UL signal received by the active stylus.

As shown in FIG. 4B, when the user's palm, which is not any part of the hand holding the active stylus, approaches or contacts (collectively referred to as touches) the touch display panel, the UL signal transmitted from the touch sensing electrodes would not only be received by the active stylus, but also be received by the user's palm and transmitted to the stylus shell of the active stylus, so the intensity of the UL signal $Pen_{UL}$ received by the active stylus is a difference between the intensity of the UL signal $Panel_{UL}$ transmitted from the touch sensing electrodes and the intensity of the UL signal $Body_{UL}$ (UL interference signal) received through the palm. That is, the intensity of the UL signal $Pen_{UL}$ received by the active stylus would be greatly reduced, which may affect the active stylus's sensing of the UL signal, and may interrupt UL transmission in severe cases. In addition, in some cases, the user's hand holding the stylus may also touch or approach the touch display panel, which also affects the intensity of the UL signal received by the active stylus.

Therefore, the embodiments of the present disclosure provide a driving method of touch display panel, which may provide different signals to regions on the touch display panel based on the touch positions of the human body and/or the active stylus, so as to reduce the influence of the human body on the intensity of the UL signal received by the active stylus as much as possible.

Figure 5A:
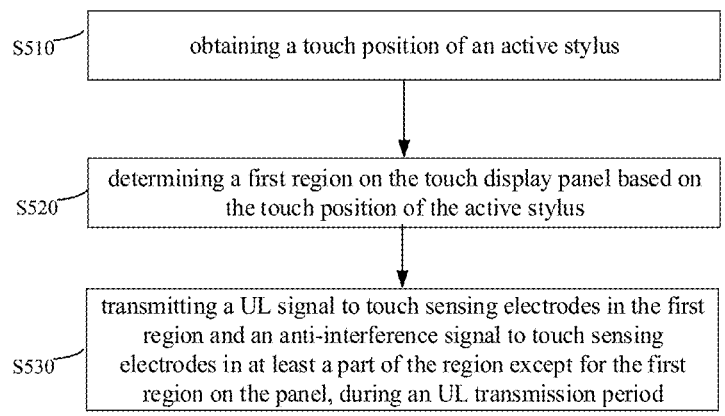
FIGS. 5A-5B respectively illustrate flowcharts of driving methods of a touch display panel according to the embodiments of the present disclosure.
Figure 5B:
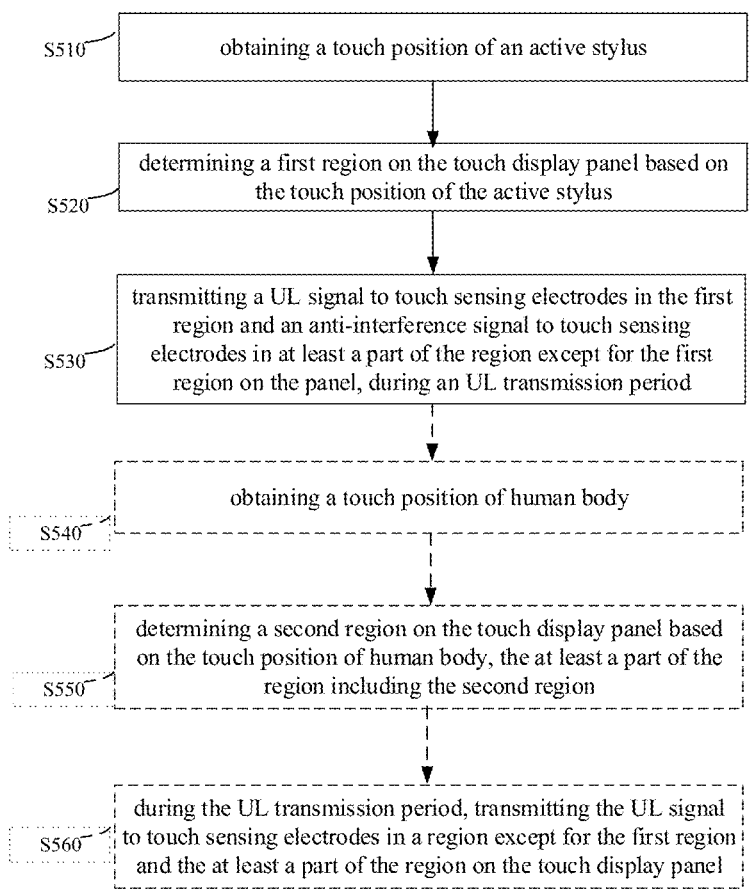

FIGS. 5A-5B respectively illustrate flowcharts of a driving method of a touch display panel according to the embodiments of the present disclosure. The touch display panel may be the touch display panel in the touch display device shown in FIG. 2, and the driving method may be performed by the driving circuit shown in FIG. 2.

As shown in FIG. 5A, in step S510, the touch position of the active stylus is obtained.

For example, the touch position of the active stylus may be the position where the active stylus approaches or contacts the touch display panel. The previously detected touch position of the active stylus which is temporally closest to current time may be used as the currently obtained touch position of the active stylus. For example, a plurality of previously detected touch positions of active stylus may be stored in association with the detection time, so as to obtain the temporally closest touch position of the active stylus.

In step S520, a first region on the touch display panel is determined based on the touch position of the active stylus.

For example, a region corresponding to all touch sensing electrodes on the column where the obtained touch position of active stylus is located and on the first preset number of adjacent columns may be determined as the first region. In the context of present disclosure, the column where the touch position of the active stylus or the touch position of human body is located refers to the column where the corresponding touch sensing electrode(s) of the touch position of the active stylus or of the human body is located.

Alternatively, considering that the active stylus may move, in addition to the above described manner that a region corresponding to all the touch sensing electrodes on the column where the obtained touch position of active stylus is located and on the adjacent first preset number of adjacent columns may be determined as the first region, the touch range and/or movement speed of the active stylus may be determined based on at least one touch position of the active stylus within a previous predetermined period, and the first region may be determined based on the touch range and/or movement speed of the active stylus.

For example, it is known that the touch range of the active stylus in the previous predetermined period is the region corresponding to some of the touch sensing electrodes on columns 2-3, then a region corresponding to all touch sensing electrodes on columns 2-3 or columns 2-4 may be determined as the first region. For another example, if the movement speed of the active stylus is known, it is possible to calculate the current possible touch positions of the active stylus in all directions from the obtained touch position of the active stylus (the temporally closest touch position of the active stylus), and determine the columns corresponding to these possible touch positions, and then the region corresponding to all touch sensing electrodes on these columns may be used as the first region.

It should be noted that, in the array of touch sensing electrodes shown in FIG. 2, although the touch position of the active stylus may only involve part of the touch sensing electrodes on one column, because the mutual interference between adjacent touch sensing electrodes on the same column may be reduced by transmitting a same signal simultaneously to the touch sensing electrodes on the same column for driving, and, due to the hardware circuit, the mutual influence between the touch sensing electrodes on adjacent columns is relatively small, the same signal (e.g., UL signal, anti-interference signal, touch excitation signal) will be transmitted for all touch sensing electrodes on the same column. Therefore, in the context of the present disclosure, the first region, the second region, the third region, other regions and the like mentioned all include at least one column of touch sensing electrodes.

In step S530, during the uplink (UL) transmission period, a UL signal is transmitted to touch sensing electrodes in the first region, and an anti-interference signal is transmitted to touch sensing electrodes in at least a part of the region except for the first region on the touch display panel.

As described above, the UL signal transmitted to the touch sensing electrodes in the first region during the UL transmission period is for transmission to the active stylus, and the active stylus is used to receive the UL signal from the touch display panel during the UL transmission period to obtain and decode UL information.

Alternatively, the anti-interference signal may include, for example, a direct current (DC) voltage signal (a signal with a fixed amplitude or grounding voltage (e.g., 0V)), a high-impedance signal (HiZ), or a variable signal with an amplitude smaller than the UL signal (with a same frequency and a same phase with the UL signal), but is not limited thereto. The type of the anti-interference signal can be determined according to the characteristics of the panel, as long as the intensity of the UL signal (regarded as the UL interference signal) transmitted from the human body (for example, the palm) to the stylus shell of the active stylus may be reduced.

For example, the at least a part of the region may include a region corresponding to the touch position of human body where the human body touches or approaches the touch display panel. The region corresponding to the touch position of human body may be an orthographic projection region of the human body on the touch display panel, and its size is determined by the contact area between the human body and the touch display panel. By transmitting an anti-interference signal to at least the touch sensing electrodes in the region corresponding to the touch position of human body, the intensity of the UL (regarded as the UL interference signal) signal conducted to the active stylus through the human body may be reduced.

According to one implementation, the at least a part of the region includes the other region except for the first region, i.e., the anti-interference signal may be transmitted to touch sensing electrodes in all the other region except for the first region on the touch display panel.

Figure 6A:
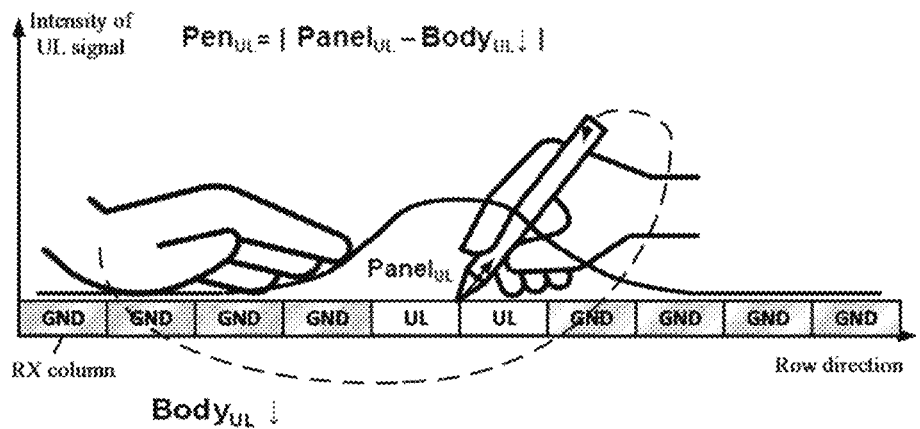
FIGS. 6A-6B illustrate schematic diagrams of an implementation in which an anti-interference signal is transmitted to the touch sensing electrodes in the other region except for the first region.
Figure 6B:
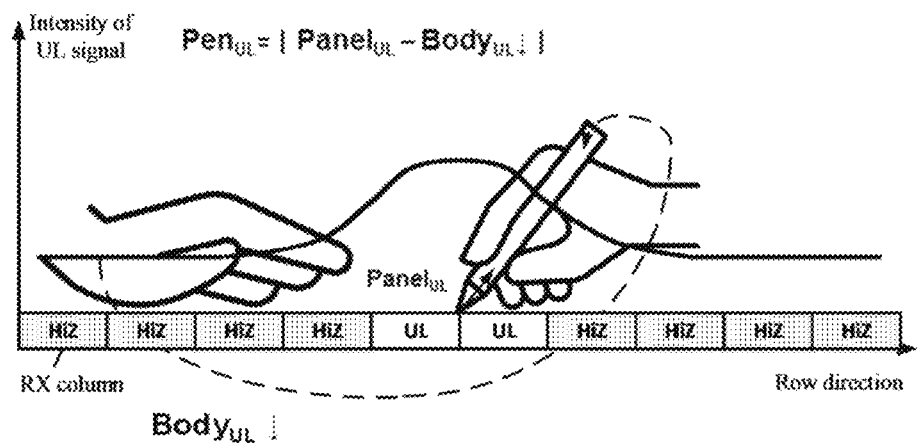

For example, FIGS. 6A-6B illustrate schematic diagrams of such an implementation.

As shown in FIGS. 6A and 6B, the signals transmitted to the touch sensing electrodes in the first region and the other region except for the first region are shown in different patterns. FIG. 6A is an example in which a ground voltage signal is transmitting to touch sensing electrodes in the other region except for the first region, and FIG. 6B is an example in which a high-impedance signal (HiZ) is transmitted to touch sensing electrodes in the other region except for the first region.

In the implementations shown in FIGS. 6A-6B, the UL signal $Pen_{UL}$ received by the active stylus may be an absolute value of a difference of the UL signal transmitted from the touch sensing electrodes and the UL interference signal conducted to the stylus shell of the active stylus through the human body, which can be expressed as $Pen_{UL}=|Panel_{UL}-Body_{UL}|$, where $Panel_{UL}$ indicates the intensity of the UL signal transmitted from the touch sensing electrodes in the first region, $Body_{UL}$ indicates the intensity of the UL interference signal conducted to the active stylus through the human body (palm). Therefore, by transmitting the anti-interference signal to the touch sensing electrodes in the other region except for the first region, although the intensity of the UL signal $Panel_{UL}$ transmitted to the touch sensing electrodes in the first region is reduced with respect to the situation in which the UL signal is transmitted to the touch sensing electrodes in the whole region of the touch display panel, the intensity of the UL interference signal (Body$_{UL}$) may be reduced to a low value (e.g., 0), so the intensity of the UL signal Pen$_{UL}$ received by the active stylus is relatively increased with respect to the situation (FIGS. 4A-4B) in which the UL signal is transmitted to the touch sensing electrodes in the whole region of the touch display panel. Accordingly, the sensing effect of the active stylus may also be improved by a certain extent.

In the implementation described with reference to FIGS. 6A-6B, the signal intensity of the UL interference signal conducted to the active stylus through the human body may be reduced, and the sensing effect of the active stylus may be improved.

In addition, in the embodiment described with reference to FIGS. 6A-6B, since the UL signal is only transmitted to touch sensing electrodes in the first region on the touch display panel, the active stylus may not receive a UL signal with sufficient intensity, resulting the encoded data in the UL signal may not be sensed, causing the driving circuit (TDDI chip) may not communicate normally with the active stylus bi-directionally.

Therefore, as shown in FIG. 5B, the driving method shown in FIG. 5A may further include the following steps S540-S560.

It should be noted that, in the context of the present disclosure, although the various steps in the flowcharts of the methods are shown in a sequential manner, these steps may not be performed in the shown order, but may be performed alternately or simultaneously, or performed in a reverse order, according to actual conditions, and the present disclosure is not limited thereto. For example, for steps S510-560, step S540 may be performed before step S510, and step S560 may be performed simultaneously with step S530, and so on.

In step S540, the touch position of human body is obtained.

For example, the detection of the touch position of human body (e.g., palm) is performed in each touch detection period. For example, a driving circuit (e.g., a TDDI chip) transmits a touch excitation signal to the touch sensing electrodes during the touch detection periods, and obtains sensed signals from the touch sensing electrodes, and determines the touch position of human body where the human body contacts or approaches the touch display panel based on the sensed signals. For example, in each touch detection period as shown in FIG. 3, touch detection is performed on at least a part of the touch sensing electrodes in the plurality of touch sensing electrodes included in the touch display panel, and it is determined that whether a touch event occurs at the part of the touch sensing electrodes, that is, whether the human body touches this part of the touch sensing electrodes.

Similar to the touch position of the active stylus, the touch position of human body obtained in step S540 may be the previously detected touch position of human body which is temporally closest to current time. For example, a plurality of touch positions of human body previously detected may be stored in association with the detection time, so as to obtain the temporally closest touch position of human body.

In step S550, a second region on the touch display panel is determined based on the touch position of human body, wherein the at least a part of the region (the anti-interference signal is transmitted to touch sensing electrodes thereof) mentioned in step S530 includes the second region.

For example, the second region includes a region corresponding to all touch sensing electrodes on the column where the touch position of human body is located, or includes a region corresponding to all touch sensing electrodes on the column where the touch position of human body is located and on a second preset number of adjacent columns (a second preset number of columns adjacent to the column where the touch position of human body is located).

In step S560, during the UL transmission period, the UL signal is transmitted to the touch sensing electrodes in the region except for the first region and the at least a part of the region on the touch display panel.

Alternatively, the second region may overlap with the first region, for example, when the touch position of the active stylus and the touch position of human body are relatively close. Since it is necessary to ensure the range of the first region to ensure the intensity of the UL signal transmitted to the active stylus from the touch display panel, in the case that the second region and the first region overlap, the second region at this time should be considered as a region in the determined second region that does not overlap with the first region, and transmitting the anti-interference signal to the touch sensing electrodes in the second region may be considered as transmitting the anti-interference signal to the touch sensing electrodes in the region of the second region that does not overlap with the first region.

Alternatively, when the anti-interference signal is transmitted to the touch sensing electrodes in the second region, and is transmitted to the touch sensing electrodes in the other region on the touch display panel except for the first region and the at least a part of the region including the second region, similarly to the situation described in FIGS. 6A-6B, the intensity of the UL interference signal conducted to the active stylus through the human body may be reduced, but the active stylus may not receive the UL signal with sufficient intensity.

Therefore, in another implementation, the UL signal may be transmitted to the touch sensing electrodes in the other region except for the first region and the at least a part of the region including the second region (hereinafter, referred to as the other region for short) on the touch display panel. The at least a part of the region may only include the second region, may include the second region and some region except for the first region and the second region, such as some region adjacent to the second region, or may include the whole region except for the first region as shown in FIGS. 6A-6B, which is not limited by the present disclosure.

For example, increasing the number of touch sensing electrodes transmitting the UL signal may increase the intensity of the UL signal received by the active stylus, so as to resist interference from other noises. Alternatively, the UL signal transmitted to the touch sensing electrodes in the other region except for the first region and the at least a part of the region including the second region may be the same as the UL signal transmitted to the touch sensing electrodes in the first region. Alternatively, the UL signal transmitted to the touch sensing electrodes in the other region may be a variable signal with a different amplitude as the UL signal transmitted to the touch sensing electrodes in the first region.

Figure 7A:
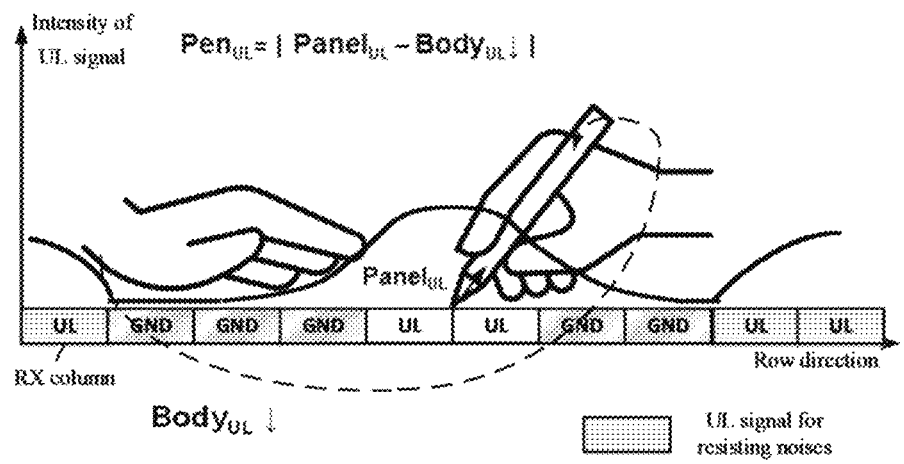
FIGS. 7A-7B illustrate schematic diagrams of an implementation in which the UL signal is transmitted to the touch sensing electrodes in the other region except for the first and second regions.
Figure 7B:
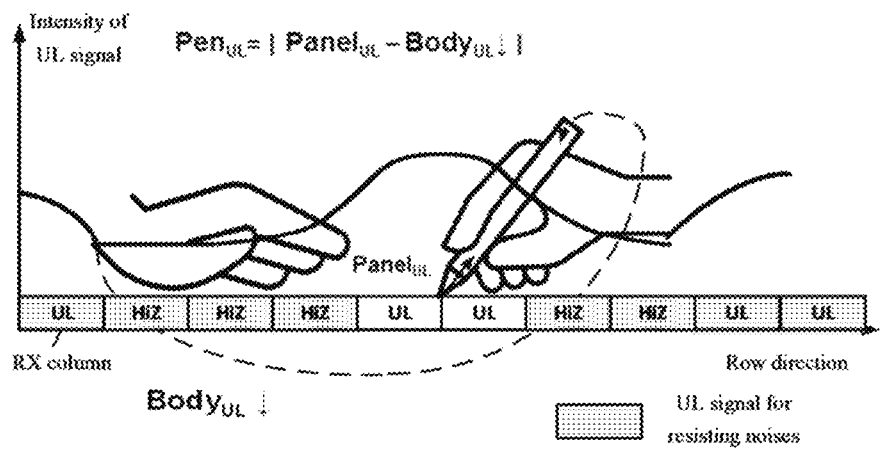

For example, FIGS. 7A-7B illustrate schematic diagrams of such an implementation.

FIGS. 7A-7B show schematic diagrams of signals transmitted to touch sensing electrodes in the first region, a second region, and the other regions with different patterns, wherein FIG. 7A is an example in which a ground voltage signal is transmitted to the touch sensing electrodes in the other region, and FIG. 7B is an example in which a high-impedance signal is transmitted to touch sensing electrodes in the other region. In FIGS. 7A-7B, for example, the at least a part of the region only includes the second region.

For example, in the embodiment shown in FIGS. 7A-7B, the intensity of the UL signal $Pen_{UL}$ received by the active stylus may be expressed as $Pen_{UL}=|Panel_{UL}-Body_{UL}|$, wherein $Pen_{UL}$ indicates the intensity of the UL signal transmitted to the touch sensing electrodes in the first region and the other region except for the first and second regions, $Body_{UL}$ indicates the intensity of the UL interference signal conducted to the active stylus through the human body (palm). Therefore, by transmitting the anti-interference signal to the touch sensing electrodes in the second region, and transmitting the UL signal to the touch sensing electrodes in the other region except for the first and second regions, compared to the situation in which the UL signal is only transmitted to the touch sensing electrodes in the first region, the intensity of the UL signal received by the active stylus may be increased (which may be reduced a little compared to the situation where the UL signal is transmitted to the touch sensing electrodes in the whole region of the touch display panel). Further, when the intensity of the UL signal $Pen_{UL}$ received by the active stylus increases accordingly with respect to the situations shown in FIGS. 6A-6B and FIGS. 4A-4B, it may also be ensured to be sufficient to resist interference from other noises, therefore the sensing effect of the active stylus may also be further improved.

Therefore, in the embodiment described with reference to FIGS. 7A-7B, not only the intensity of the interference signal conducted to the active stylus through the human body may be reduced, but also the intensity of the UL signal received by the active stylus may be ensured to be high enough to resist the interference of other noises. Therefore, the sensing effect of the active stylus may be further improved.

In addition, in some situations, when the human body (for example, the palm) touches the touch display panel, and the first region is determined, the UL signal is transmitted to the touch sensing electrodes in the first region, and a DC voltage signal as the anti-interference signal is transmitted to the touch sensing electrodes in the whole region (including the second region) except for the first region, e.g., the situation as shown in FIG. 6A, if the touch position of human body is close to the touch position of the active stylus, some UL signals may still be coupled to the human body (e.g., palm), and then coupled to the stylus shell of the active stylus through the human body. At this time, the intensity of the UL signal received by the stylus may be reduced too much, which may cause the active stylus to lose the UL signal.

Therefore, in other embodiments of the present disclosure, this problem may also be solved by setting a buffer region near the first region.

For example, in some embodiments, the driving method 500 may further include: determining a region corresponding to touch sensing electrodes on a third preset number of columns adjacent to the first region as a buffer region (a third region); and during the UL transmission period, transmitting a buffer signal to touch sensing electrodes in the buffer region, and transmitting a DC voltage signal as the anti-interference signal to touch sensing electrodes in whole region except for the first region and the buffer region on the touch display panel. At this time, the at least a part of the region (the anti-interference signal is to be transmitted to the touch sensing electrodes in the at least a part of the region) as mentioned in step S530 does not include the buffer region.

Alternatively, the buffer signal includes a high-impedance signal or a signal with an amplitude smaller than the UL signal.

In addition, the third region may be adjacent to the first region and located on one side of the first region, or may be adjacent to the first region and located on both sides of the first region.

That is, the third region may be as a buffer region adjacent to the first region, and the buffer signal is transmitted to the touch sensing electrodes included therein, so as to buffer the reduction of the intensity of the UL signal received by the active stylus, thus avoiding the loss of the UL signal by the active stylus.

In this way, even if the touch position of human body is relatively close to the touch position of the active stylus, i.e., the second region and the first region are relatively close, the intensity of the UL signal received by the active stylus would not be reduced too much, thus preventing the active stylus from losing the UL signal.

As described above, the problem of the active stylus losing the UL signal usually occurs when the touch position of human body (e.g., the palm) is relatively closer to the touch position of the active stylus; if the touch position of human body (e.g., the palm) is away from the touch position of the active stylus, the problem that the active stylus loses the UL signal may be less likely to occur. For example, if the distance between the second region and the first region is too large, that is, the touch position of human body is away from the touch position of the active stylus (or from the first region), the intensity of the UL signal coupled to the human body (e.g., palm) is very small, which has little influence on the intensity of the UL signal actually received by the active stylus, and thus would not affect the sensing of the UL signal by the active stylus; and, if the distance between the second region and the first region is too small, it may not be enough to set the buffer region (the buffer region to include at least touch sensing electrodes on a third preset number of columns may have a better buffering effect).

In the above embodiment, the distance between the touch position of human body and the touch position of the active stylus is not considered, and the third region is directly set near the edge of the first region, which may simplify the determination process, save computing cost, and improve the processing efficiency of the chip.

In other embodiments, the setting of the buffer region may also be determined according to the distance between the touch position of human body (for example, the palm) and the touch position of the active stylus, which may also be equivalent to the distance between the first region and the second region. The above distance can be, for example, the distance represented by the number of electrode columns between the electrode column where the touch position of human body is located and the electrode column where the touch position of the active stylus is located, or the distance between the coordinates of the electrode column where the touch position of human body is located and the electrode column where the touch position of the active stylus is located, or the distance between the more accurate coordinates of the electrode column where the touch position of human body is located and the electrode column where the touch position of the active stylus is located.

For example, the driving method 500 may further include: obtaining a touch position of human body; determining a distance between the touch position of the active stylus and the touch position of human body (which also may be a distance between the first region and the second region after the second region is determined); and when the distance is within a threshold range between the first threshold and the second threshold; determining a region corresponding to touch sensing electrodes on a third preset number of columns adjacent to the first region as a buffer region, when the distance is within a threshold range; and during the UL transmission period, transmitting a buffer signal to touch sensing electrodes in the buffer region, and transmitting a DC voltage signal as the anti-interference signal to touch sensing electrodes in whole region except for the first region and the buffer region on the touch display panel. At this time, the at least a part of the region (the anti-interference signal is to be transmitted to the touch sensing electrodes in the at least a part of the region) as mentioned in step S530 includes the region corresponding to the touch position of human body (or the second region), and does not include the buffer region.

Alternatively, the distance between the touch position of the active stylus and the touch position of human body or the distance between the first region and the second region may be directly related to the number of columns of touch sensing electrodes included therebetween.

In addition, as described above, the buffer signal may include a high-impedance signal or a signal with an amplitude smaller than the UL signal.

That is, in these embodiments, the buffer region is set only when the distance between the touch position of the active stylus and the touch position of human body or the distance between the first region and the second region satisfies the threshold condition.

Figure 8:
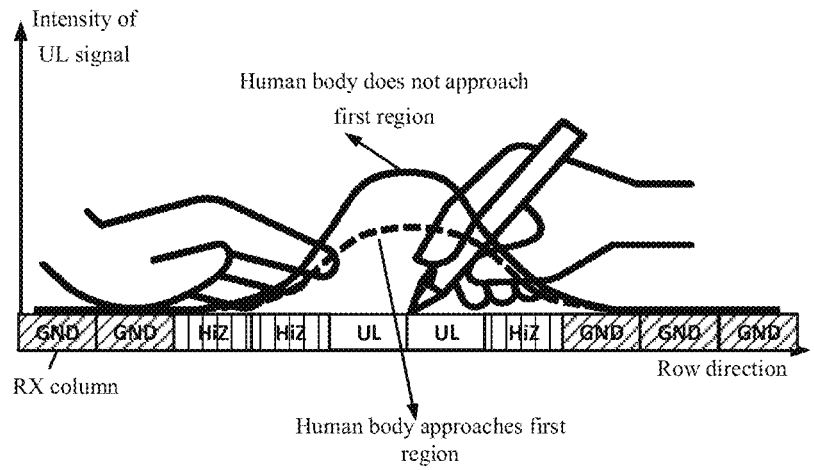
FIG. 8 is a schematic diagram of an implementation in which a buffer region is set.

FIG. 8 is a schematic diagram of the implementation in which a buffer region is set.

As shown in FIG. 8, the signals transmitted to the touch sensing electrodes in the first region, the second region and the buffer region (the third region) are shown in different patterns.

In FIG. 8, a DC voltage signal (GND) is transmitted to the touch sensing electrodes in the second region where the human body (palm) contacted, a high-impedance signal (HiZ) is transmitted to the touch sensing electrodes in the buffer region, and a UL signal (UL) is transmitted to the touch sensing electrodes in the first region. The solid black line indicates the change in the intensity of the UL signal received by the active stylus when the human body is not in contact with or approaching the touch display panel, and the dashed black line indicates the change in intensity of the UL signal received by the active stylus when the human body is in contact with or approaching the touch display panel.

Referring to FIG. 8, when the human body contacts or approaches the touch display panel, the intensity of the UL signal received by the active stylus will decrease to a certain extent, but it still has an amplitude that meets the requirements, and the intensity also changes gradually. Therefore, the active stylus may be ensured to sense the UL signal normally.

In addition, alternatively, the driving method 500 may further include: forbidding setting the buffer region when the distance between the touch position of the active stylus and the touch position of human body is smaller than the first threshold, that is, there is no enough space to set the buffer region.

When the buffer region is not set, the driving method above may be referred to. For example, a UL signal may be transmitted to the touch sensing electrodes in the first region, and an anti-interference signal may be transmitted to the touch sensing electrodes in other regions except for the first region. In order to implement the buffering effect, a high-impedance signal or a signal with an amplitude smaller than the UL signal may be selected as the anti-interference signal.

Alternatively, the driving method 500 may further include: forbidding setting the buffer region when the distance between the touch position of the active stylus and the touch position of human body is greater than the second threshold, because the intensity of the UL signal coupled to the human body (e.g., palm) is very small, which has little influence on the intensity of the UL signal actually received by the active stylus. In addition, the driving circuit may transmit a DC voltage signal, a high-impedance signal, or a signal with an amplitude smaller than the UL signal to the touch sensing electrodes in all the other region except for the first region.

Similarly, for example, the UL signal may be transmitted to the touch sensing electrodes in the first region, and the anti-interference signal may be transmitted to the touch sensing electrodes in the other region (including the second region) except for the first region. The anti-interference signal may be a DC voltage signal, a high-impedance signal, or a signal with an amplitude smaller than the UL signal.

Thus, by setting the buffer region based on the distance between the touch position of the active stylus and the touch position of human body, more precise driving may be achieved.

Therefore, in the embodiments described with reference to FIGS. 5-8, by transmitting the anti-interference signal to the touch sensing electrodes in at least a part of the region except for the first region (determined based on the touch position of the active stylus), the intensity of the interference signal conducted to the active stylus by the human body may be reduced, and the sensing effect of the active stylus may be improved; further, by transmitting the UL signal to the touch sensing electrodes in other regions except for at least the first and second regions on the touch display panel, the intensity of the UL signal received by the active stylus may also be ensured to be high enough to resist the interference of other noises, so the sensing effect of the active stylus may be further improved; in addition, by setting a buffer region near the first region, the problem that the active stylus may lose the UL signal, which may occur when the touch position of the active stylus is close to the touch position of human body, may be avoided, thus the normal operation of the active stylus may be ensured.

As described above, in the case that the anti-interference signal is transmitted to the touch sensing electrodes in other regions except for the first region on the touch display panel, the intensity of the UL signal received by the active stylus may not be high enough to resist interference from other noises. With respect to such issue, in addition to the manner in which the UL signal is transmitted to the touch sensing electrodes in other regions except for the first region and the at least a part of the region afore-mentioned including the second region, according to other embodiments of the present disclosure, different transmission manners of the driving signal may also ensure that the intensity of the UL signal received by the active stylus is high enough to resist the interference of other noises.

Figure 9:
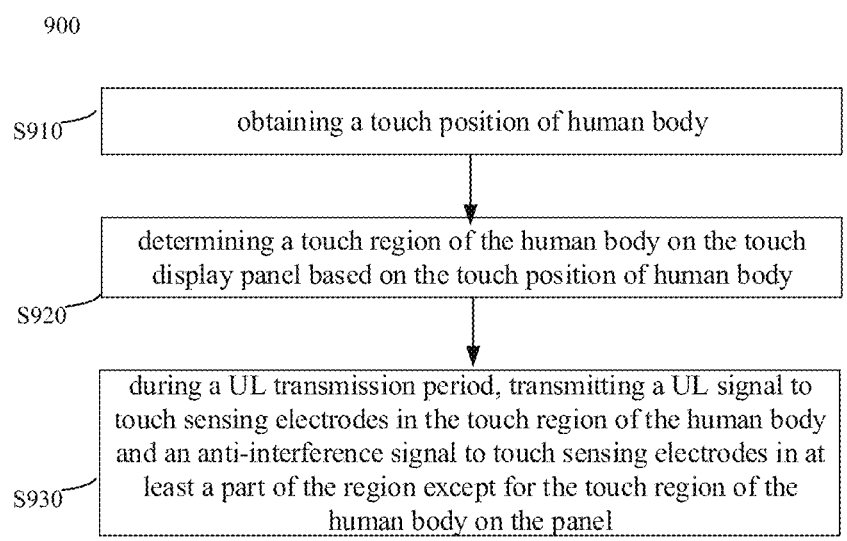
FIG. 9 illustrates a flowchart of a driving method of touch display panel according to the embodiments of the present disclosure.

FIG. 9 illustrates a flowchart of a driving method 900 according to another embodiment of the present disclosure.

As shown in FIG. 9, in step S910, the touch position of human body is obtained.

For example, as described above with reference to FIGS. 5-8, the touch position of human body may be detected in respective touch detection periods, and the obtained touch position of human body may be the previously detected touch position of human body which is temporally closest to current time.

In step S920, a touch region of the human body on the touch display panel is determined based on the touch position of human body.

Alternatively, the touch region of the human body includes a region corresponding to all touch sensing electrodes on the column where the touch position of human body is located; or the touch region of the human body includes a region corresponding to all touch sensing electrodes on the column where the touch position of human body is located and the second predetermined number of adjacent columns.

Optionally, the number of the touch regions of human body can be one or more.

Thereafter, in step S930, during the UL transmission period, the UL signal is transmitted to the touch sensing electrodes in the touch region of the human body, and the anti-interference signal is transmitted to the touch sensing electrodes in at least a part of the region except for the touch region of the human body on the touch display panel.

Similarly, the UL signal transmitted to the touch sensing electrodes in the touch region of the human body during the UL transmission period is transmitted to the active stylus through the human body.

Alternatively, during the UL transmission period, the anti-interference signal may be transmitted to the touch sensing electrodes in all regions of the touch display panel except for the touch region of the human body.

Alternatively, during the UL transmission period, the anti-interference signal may be transmitted to the touch sensing electrodes in a region at least including the region corresponding to the touch position of the active stylus except for the touch region of the human body on the touch display panel. The region corresponding to the touch position of the active stylus may be the first region determined in the embodiments described above with reference to FIGS. 5-8. At this time, the driving method 900 may further include: obtaining the touch position of the active stylus; and determining a region corresponding to touch position of the active stylus based on touch position of the active stylus.

For example, the manner of determining the region corresponding to the touch position of the active stylus may be similar to that of determining the first region. For example, a region corresponding to all touch sensing electrodes on the column where the touch position of the active stylus is located and the first preset number of adjacent columns may be determined as the region corresponding to the touch position of the active stylus. Alternatively, considering that the active stylus may move, in addition to the above described manner that a region corresponding to all touch sensing electrodes on the column where the obtained touch position of active stylus is located and on the first preset number of adjacent columns may be determined as the region corresponding to the touch position of the active stylus, the touch range and/or movement speed of the active stylus may be determined based on at least one touch position of the active stylus in the previous predetermined period, and the region corresponding to the touch position of the active stylus may be determined based on the touch range and/or movement speed of the active stylus.

Figure 10A:
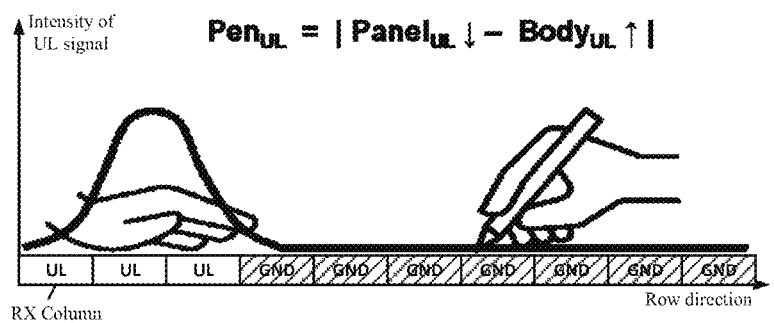
FIGS. 10A-10B illustrate schematic diagrams of an embodiment of the driving method shown in FIG. 9.
Figure 10B:
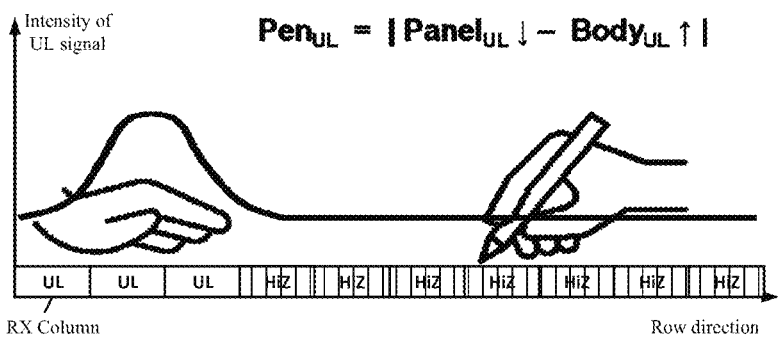

For example, FIGS. 10A-10B illustrate schematic diagrams of specific implementations of such embodiments.

As shown in FIGS. 10A and 10B, signals transmitted to the touch sensing electrodes in the touch region of the human body and the other region except for the touch region of the human body are illustrated in different patterns, respectively. FIG. 10A is an example in which a ground voltage signal is transmitted to touch sensing electrodes in the other region except for the touch region of the human body, and FIG. 10B is an example in which a high-impedance signal (HiZ) signal is transmitted to the touch sensing electrodes in the other region except for the touch region of the human body.

Specifically, as an example, as shown in FIG. 10A, the UL signal is transmitted to the touch sensing electrodes in the touch region of the human body, and the ground voltage signal is transmitted to the touch sensing electrodes in the other region except for the touch region of the human body. In this way, the intensity of the UL signal (represented by $Panel_{UL}$) transmitted to the active stylus through the touch sensing electrodes in the other region except for the touch region of the human body may be minimized, for example, close to 0, and the intensity of the UL signal (represented by $Body_{UL}$) transmitted to the stylus shell of the active stylus through the touch sensing electrodes in the touch region of the human body has a relatively large value. Therefore, according to the expression of the intensity of the UL signal received by the active stylus $Pen_{UL}=|Panel_{UL}-Body_{UL}|$, it can be seen that $Pen_{UL}$ is greater than 0, and the higher the intensity of the corresponding UL signal is, the better the sensing effect of the active stylus is.

As another example, as shown in FIG. 10B, the UL signal is transmitted to the touch sensing electrodes in the touch region of the human body, and the high-impedance signal HiZ (that is, setting the touch sensing electrode to be floating) is transmitted to the touch sensing electrodes in the other region except for the touch region of the human body. In this way, the voltages of the touch sensing electrodes in the other region except for the touch region of the human body will fluctuate due to the effect of the environment, for example, the voltage of the touch sensing electrodes which has been set to HiZ may vary as the touch of the active stylus and the human body, and the touch sensing electrodes which has been set to HiZ may be coupled to have a small amount of UL signal. For example, the intensity of the UL signal (represented by $Panel_{UL}$) conducted by the touch sensing electrodes in the other region except for the touch region of the human body to the active stylus may be of a relatively small value, and the intensity of the UL signal (represented by $Body_{UL}$) transmitted to the stylus shell of the active stylus by the touch sensing electrodes in the touch region of the human body has a relatively large value, and therefore, according to the expression of the intensity of the UL signal received by the active stylus $Pen_{UL}=|Panel_{UL}-Body_{UL}|$, $Pen_{UL}$ is greater than 0 and has a relatively large value, and the active stylus may also have a better sensing effect. Further, the difference between the intensity of the UL signal received by active stylus shell through the human body and from the touch sensing electrodes in the touch region of the human body and the intensity of the UL signal transmitted from the touch sensing electrodes in the region corresponding to the touch position of the active stylus (the first region) is reduced, resulting in a buffering effect. If the touch position of human body is close to the touch position of the active stylus, the problem that the active stylus may lose the UL signal and fail to sense may be avoided.

Therefore, through the driving method described in conjunction with FIGS. 9-10B, the UL signal may be transmitted to the touch sensing electrodes in the touch region of the human body and the anti-interference signal may be transmitted to the touch sensing electrodes in at least the region corresponding to the touch position of the active stylus, so that the active stylus may still receive the UL signal with a relatively high intensity, so as to resist the interference of other noises.

According to another aspect of the present disclosure, a driving circuit of a touch display panel is also provided. The touch display panel may be the touch display panel in the touch display device shown in FIG. 2, and the driving circuit may be the driving circuit shown in FIG. 2.

Figure 11:
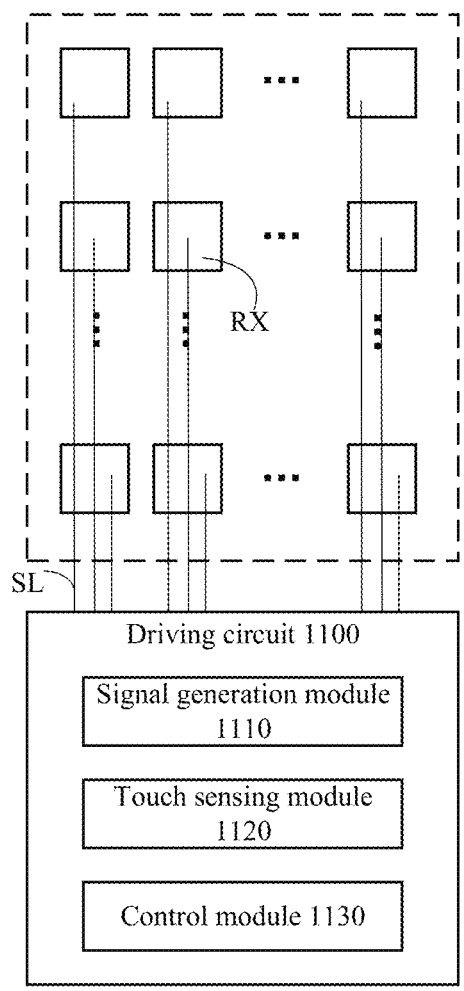
FIG. 11 illustrates a structural block diagram of a driving circuit of the touch display panel according to the embodiments of the present disclosure.

FIG. 11 illustrates a schematic diagram of a driving circuit according to the embodiments of the present disclosure. The first touch display panel may have a plurality of touch sensing electrodes arranged in an array as shown in FIG. 2.

As shown in FIG. 11, the driving circuit 1100 may include a signal generating module 1110, a touch sensing module 1120 and a control module 1130.

It should be noted that FIG. 11 only illustrates the circuit modules related to the driving process of touch sensing in the driving circuit. If the driving circuit is a chip such as TDDI or FTDI, the driving circuit may also include circuit modules related to display driving and/or fingerprint identification, or the circuit modules illustrated may also be associated with operations of display driving and/or fingerprint identification, which are omitted herein in order not to obscure the inventive concept of the embodiments of the present disclosure.

In FIG. 11, the signal generation module 1110 may be used to generate the uplink (UL) signal and the anti-interference signal.

The different signals (i.e., the UL signal and the anti-interference signal) generated by the signal generating module 1110 are transmitted to the touch sensing electrodes of the touch display panel during corresponding period, that is, the UL signal or an anti-interference signal is selectively transmitted to each of the touch sensing electrodes during the UL transmission period(s).

The touch sensing module 1120 is used to receive the DL signal from the plurality of touch sensing electrodes of the touch display panel during the downlink (DL) transmission period(s) of the active stylus, where the DL signal is used to determine the touch position of the active stylus.

For example, the touch sensing module may receive a DL signal from the plurality of touch sensing electrodes of the touch display panel during the DL transmission period(s), wherein the DL signal is transmitted to the touch sensing electrodes by the active stylus, and the DL information carried by the DL signal may be used to determine the touch location of the active stylus. After preliminary process on the received DL signal (for example, denoising, filtering, etc.) by the touch sensing module, a position processing module may determine whether an active stylus touch event occurs at these touch sensing electrodes accordingly, for example, determine the touch location of the active stylus. Alternatively, the position processing module may be included in the touch sensing module 1120, or may be included in the control module 1130, or may be an independent module, which is not limited in the present disclosure.

The control module 1130 is configured to: obtain the touch position of the active stylus; determine the first region on the touch display panel based on the touch position of the active stylus; during the UL transmission period, perform control such that the UL signal is transmitted to the touch sensing electrodes in the first region, and the anti-interference signal is transmitted to the touch sensing electrodes in at least a part of the region except for the first region on the touch display panel.

In this way, by only transmitting the UL signal to the first region on the touch display panel and transmitting the anti-interference signal to other regions (including the region corresponding to the touch position of human body), the intensity of the UL interference signal conducted to the active stylus through the human body may be reduced, and the sensing effect of the active stylus may be improved.

Alternatively, the control module 1130 may also be configured to: obtain the touch position of human body; determine the second region on the touch display panel based on the touch position of human body, wherein the above described at least a part of the region except for the first region includes the second region; and during the UL transmission period, perform control such that the anti-interference signal is transmitted to the touch sensing electrodes in the second region, so as to reduce the intensity of the interference signal conducted to the active stylus by the human body. Alternatively, in order to enhance the intensity of the UL signal received by the active stylus, the UL signal may further be transmitted to the touch sensing electrodes in the region except for the first region and the above described at least a part of the region including the second region on the touch display panel.

In this way, not only the intensity of the interference signal conducted to the active stylus through the human body may be reduced, but also the intensity of the UL signal received by the active stylus may be ensured to be high enough to resist the interference of other noises, thereby the sensing effect of the active stylus may be further improved.

Alternatively, in order to determine the touch position of human body, the touch sensing module 1120 may also be configured to transmit a touch excitation signal to the plurality of touch sensing electrodes during the touch detection period(s), and receive the sensed signals therefrom, wherein the sensed signals may be used to determine the touch position of human body. For example, during each touch detection period as shown in FIG. 3, the touch excitation signal is provided to a part of the touch sensing electrodes in a time-division manner or simultaneously, and the sensed signals are received from these touch sensing electrodes. Likewise, after the preliminary process (e.g., denoising, filtering, etc.) on the sensed signals by the touch sensing module, the position processing module in the driving circuit may also determine the touch position of human body based on the processing result. In addition, the touch excitation signal to be transmitted to the touch sensing electrodes by the touch sensing module when performing touch detection may also be generated by the signal generating module 1110.

In addition, in other embodiments, in order to avoid the loss of UL signal due to that the intensity of the UL signal received by the active stylus is reduced too much when the touch position of human body and the touch position of the active stylus is too close, a buffer region may be set near to the first region.

Therefore, the control module 1130 is further configured to: determine a region corresponding to touch sensing electrodes on a third preset number of columns adjacent to the first region as a buffer region; and during the UL transmission period, perform control such that a buffer signal is transmitted to touch sensing electrodes in the buffer region, and a DC voltage signal as the anti-interference signal is transmitted to touch sensing electrodes in whole region except for the first region and the buffer region on the touch display panel. At this time, the above described at least a part of the region excludes the buffer region.

Alternatively, the buffer region is set only when the distance between the touch position of the active stylus and the touch position of human body is within the threshold range, so as to achieve more precise driving. At this time, the control module 1130 is also configure to: obtain a touch position of human body, then determine a distance between the touch position of the active stylus and the touch position of human body; and determine a region corresponding to touch sensing electrodes on a third preset number of columns adjacent to the first region as a buffer region when the distance is within a threshold range; and during the UL transmission period, perform control such that a buffer signal is transmitted to touch sensing electrodes in the buffer region, and a DC voltage signal as the anti-interference signal is transmitted to touch sensing electrodes in whole region except for the first region and the buffer region on the touch display panel. At this time, the at least a part of the region described above at step S530 includes the region corresponding to the touch position of human body (e.g., the second region), and does not include the third region.

More details of the above operations of the control module 1130 may refer to the content described above in conjunction with FIGS. 5-10, which will not be repeated herein.

In addition, the above division manner of respective modules in the driving circuit may be adaptively adjusted according to the actual situation, therefore, the driving circuit may include more or less modules, which is not limited in the present disclosure.

Therefore, through the driving circuit of this embodiment, by transmitting the anti-interference signal to the touch sensing electrodes in the at least a part of the region except for the first region, so that the signal intensity of the interference signal conducted to the active stylus through the human body may be reduced, and the sensing effect of the active stylus may be improved; further, by transmitting the UL signal to the touch sensing electrodes in other regions except for at least the first and second regions on the touch display panel, the intensity of the UL signal received by the active stylus may also be ensure to be high enough to resist the interference of other noises, so the sensing effect of the active stylus may be further improved; in addition, by setting a buffer region near the first region, the problem that the active stylus may lose the UL signal, which may occur when the touch position of the active stylus and the touch position of human body is close, may be avoided, so as to ensure the normal operation of the active stylus.

In addition, alternatively, according to other embodiments, in order to improve the intensity of the UL signal received by the active stylus so as to resist other noise interference, each module shown in FIG. 11 may perform different operations solve such problem.

For example, the signal generation module 1110 may be used to generate an uplink (UL) signal, an anti-interference signal, and a touch excitation signal.

The touch sensing module 1120 is configured to, during the touch detection period(s), transmit the touch excitation signal to the plurality of touch sensing electrodes and obtain the sensed signals therefrom, wherein the sensed signals may be used to determine the touch position of human body.

The control module 1130 is configured to, during the UL transmission period(s), transmit the UL signal to the touch sensing electrodes in the touch region of the human body, and transmit the anti-interference signal to the touch sensing electrodes in the at least a part of the region except for the touch region of the human body on the touch display panel (for example, the other region except for the touch region or regions including at least the first region as described above) on the touch display panel, wherein the UL signal transmitted to the touch sensing electrodes in the touch region of the human body during the UL transmission period is transmitted to the active stylus through the human body.

More details of the above operations of the control module 1130 may refer to the content described above in conjunction with FIGS. 9-10B, which will be not repeated herein.

Therefore, through the driving circuit of this embodiment, the UL signal may be transmitted to the touch sensing electrodes in the touch region of the human body and the anti-interference signal may be transmitted to the touch sensing electrodes in at least the region corresponding to the touch position of the active stylus, such that the active stylus may still sense the UL signal with a relatively high intensity, so as to resist the interference of other noises.

Figure 12:
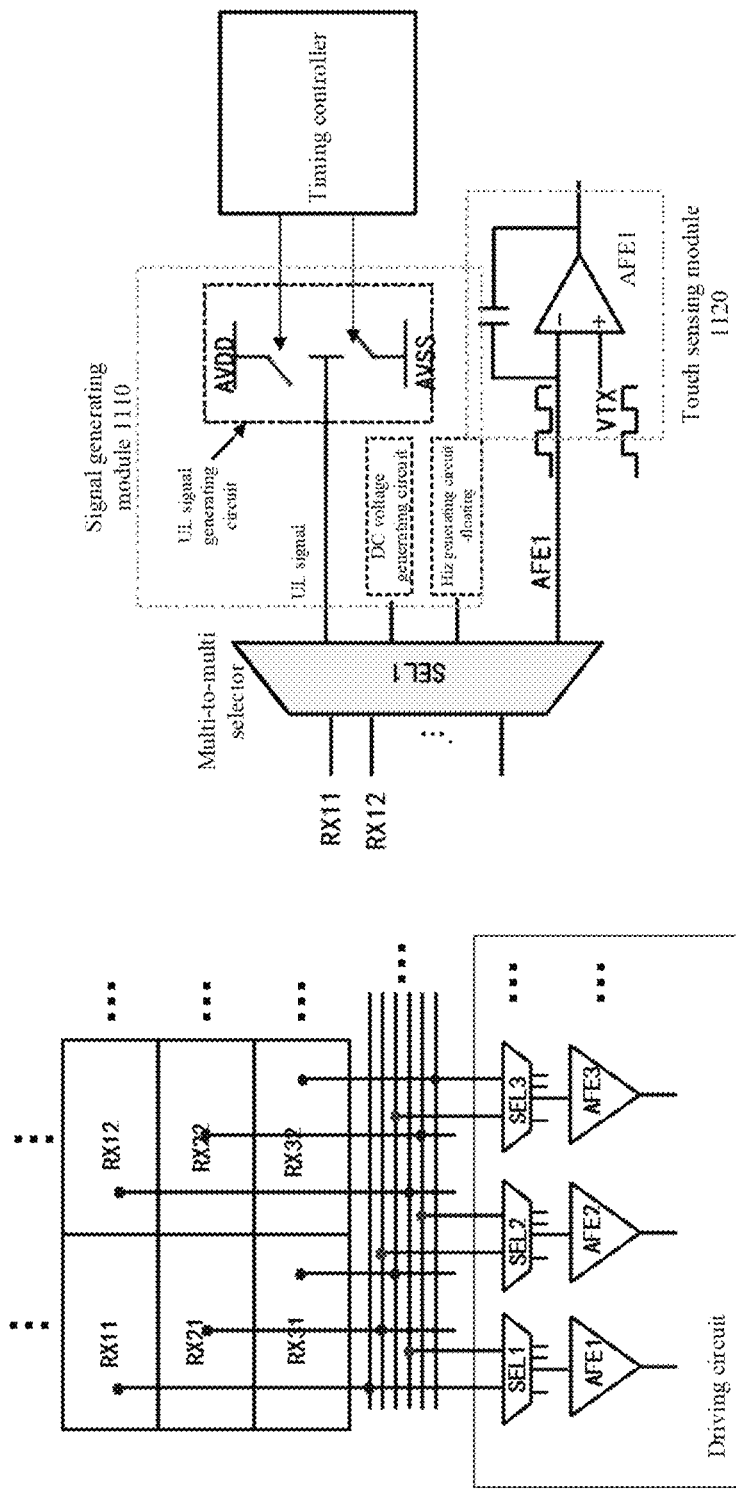
FIG. 12 illustrates a specific circuit implementation of the driving circuit shown in FIG. 11.

FIG. 12 illustrates a specific implementation of the driving circuit shown in FIG. 11.

It should be noted that although FIG. 12 illustrates a specific implementation of the driving circuit, those skilled in the art should understand that it is only shown as an example, and should not be construed as a design limitation of the driving circuit. Those skilled in the art may adopt other implementations according to the disclosure of the present disclosure, which all fall within the protection scope of the present disclosure.

As shown in FIG. 12, the signal generating module 1110 may include a UL signal generating circuit, a DC voltage signal generating circuit, and a high-impedance signal generating circuit, wherein the UL signal generating circuit may generate the UL signal under the control of the timing control signal of a timing controller, the DC voltage signal generation circuit is used to generate a DC voltage or is a ground node, and the high-impedance signal generation circuit may be a floating node (not connected to other circuits). In addition, the UL signal generating circuit may also generate UL signals with different amplitudes (a UL signal with a smaller amplitude may be used as the anti-interference signal or the buffer signal).

For example, an exemplary structure of the UL signal generating circuit is shown in FIG. 12, wherein the first switch and the second switch are connected in series between the first voltage node (high level) and the second voltage node (low level). Through the control of the timing controller, the connection node of the first switch and the second switch is used for outputting the UL signal in the form of pulses changing between a high level and a low level. The data output by the timing controller is the coded command to be transmitted to the active stylus, so the UL signal output by the UL signal generating circuit carries the coded command. For example, multiple exemplary structures in FIG. 12 may be used to generate multiple UL signals with different amplitudes.

As shown in FIG. 12, for each touch sensing electrode (RX11, RX12 . . . ), the UL signal generating circuit of the signal generating module 1110 may be connected to the touch sensing electrode so as to transmit the UL signal thereto. Similarly, the DC voltage signal generating circuit or the high-impedance signal generating circuit may also be connected to the touch sensing electrode, so that a DC voltage signal or a high-impedance signal may be transmitted thereto.

As shown in FIG. 12, for each touch sensing electrode (RX11, RX12 . . . ), the touch sensing electrode may also be connected with an analog front end in the touch sensing module, so that the touch excitation signal may be transmitted from the analog front end to the touch sensing electrode, or the analog front end may receive the sensed signal and/or DL signal from the touch sensing electrode, wherein the sensed signal and/or DL signal are used to determine the touch position of human body and/or the touch position of the active stylus.

Specifically, the touch sensing module 1120 may include a plurality of analog front ends (AFEs), each of which may be connected with a row of touch sensing electrodes simultaneously during a DL transmission period (e.g., via a selection module which will be described later), so as to receive DL signal therefrom. For example, when the analog front end is an operational amplifier, an input terminal (the first terminal) of the operational amplifier receives a DC voltage signal, and the other input terminal (the second terminal) is connected to the selection module which will be described below, so that the analog front end is connected to the touch sensing electrodes of the same row to receive DL signal therefrom based on the selection of the selection module. Because the stylus tip of the active stylus may only touches one touch sensing electrode, by connecting each analog front end to touch sensing electrodes of a same row, when the stylus tip touches any one of the touch sensing electrodes of one row, the analog front end may receive the DL signal without having to detect and determine whether the DL signal is received in sequence with respect to the touch sensing electrodes in the one row, therefore the time for receiving the DL signal may be reduced and the efficiency of the bidirectional communication of the active stylus may be improved.

In addition, each analog front end may obtain the touch excitation signal from the signal generating module 1110, so as to transmit the touch excitation signal to the touch sensing electrodes connected thereto during the touch detection period(s), and may receive sensed signals therefrom. For example, when the analog front end is an operational amplifier, an input terminal (the first terminal) of the operational amplifier receives the touch excitation signal, and the other input terminal (second terminal) is connected to the selection module which will be described below, such that the analog front end is connected to a touch sensing electrode and transmits the touch excitation signal to the touch sensing electrode based on the selection by the selection module, and then the operational amplifier receives the sensed signal from the touch sensing electrode via the selection module and its second terminal. Of course, the touch excitation signal may also be provided to the touch sensing electrodes through other circuits, and is not limited to be provided by the analog front end.

As described above, the driving circuit needs to selectively provide signals to or receive signals from the touch sensing electrodes of the touch display panel, and thus a selection module may be provided in the driving circuit. Of course, in other embodiments, the selection module may also be provided in the touch display panel, which is not limited in the present disclosure.

The selection module is configured to selectively transmit the UL signal or the anti-interference signal (or optionally the buffering signal) to each of the plurality of touch sensing electrodes on the touch display panel under the control of the selection signal (e.g., from the control module), or receive the sensed signals or the DL signal therefrom. The selection module may be implemented by a combination of switches. The selection module may not only implement the function of selecting touch sensing electrodes to be connected such as the existing multiplexer (MUX), but also perform different signal transmission with the touch sensing electrodes connected thereto during the uplink/downlink transmission period related to the active stylus, and it may also provide the same or different signals to different touch sensing electrodes at the same time respectively.

For example, for each row of touch sensing electrodes, the selection module provides one selection sub-module, e.g., one multiple-to-multiple selector. Multiple connection terminals on the first side of each multiple-to-multiple selector are connected to a plurality of touch sensing electrodes of one row in a one-to-one correspondence, and multiple connection terminals on the second side of each multiple-to-multiple selector are connected to the output terminals of the signal generating module (e.g., each of the UL signal, the DC voltage signal and the high-impedance signal corresponds to one output terminal) and the connection terminal of the touch sensing module (e.g., the second terminal of the operational amplifier of the analog front end) respectively, therefore each touch sensing electrode may be selectively connected to each output terminal of the signal generating module and the connection terminal of the touch sensing module through the control of the selection signal. In addition, the case where one selection sub-module is provided for each column of touch sensing electrodes is also similar, so the description is not repeated herein.

In addition, a plurality of multiple-to-multiple selectors (e.g., multiplexer MUX) and a plurality of analog front ends (AFEs) may be in one-to-one correspondence, that is, touch sensing electrodes of each row are connected to a same one analog front end via a multiple-to-multiple selector, but the disclosure is not limited thereto.

Depending on different design requirements, the control module may be implemented in hardware, firmware, software (i.e., a program), or in any combination of the foregoing.

In terms of hardware form, the control module may be implemented in logic circuitry on an integrated circuit. The related functions of the control module may be implemented in hardware using the hardware description language (e.g., Verilog HDL or VHDL) or other suitable programming language. For example, the related functions of the control module may be implemented in one or more controllers, microcontrollers, microprocessors, application-specific integrated circuits (ASIC), digital signal processor (DSP), field programmable gate array (FPGA) and/or various logic blocks, modules and circuits in other processing units.

In terms of software form and/or firmware form, the related functions of the control module may be implemented in logic circuits on an integrated circuit. For example, the control module may be implemented using a general-purpose programming language (e.g., C or C++) or other suitable programming language. The programming code may be recorded/stored in a recording medium, which includes for example, a read only memory (ROM), a storage device, and/or a random access memory (RAM). The programming code may be accessed from the recording medium and executed by the computer, central processing unit (CPU), controller, microcontroller or microprocessor to perform the related functions. For the recording medium, "non-transitory computer-readable medium" such as a magnetic tape, a magnetic disk, a card, a semiconductor memory, or a programmed logic circuit may be used. In addition, the program may be provided to the computer (or CPU) via any transmission medium such as a communication network or radio waves. The communication network is, for example, the Internet, wired communication, wireless communication, or other communication media.

FIGS. 13A-13D illustrate the connection manners in which the selection module of the driving circuit shown in FIG. 12 connects the touch sensing electrodes to the signal generating module and the touch sensing module at different periods. The figure schematically illustrates that the first side of the multiple-to-multiple selector SEL1 is connected to the first row of touch sensing electrodes (RX11, RX12 . . . ).

Figure 13A:
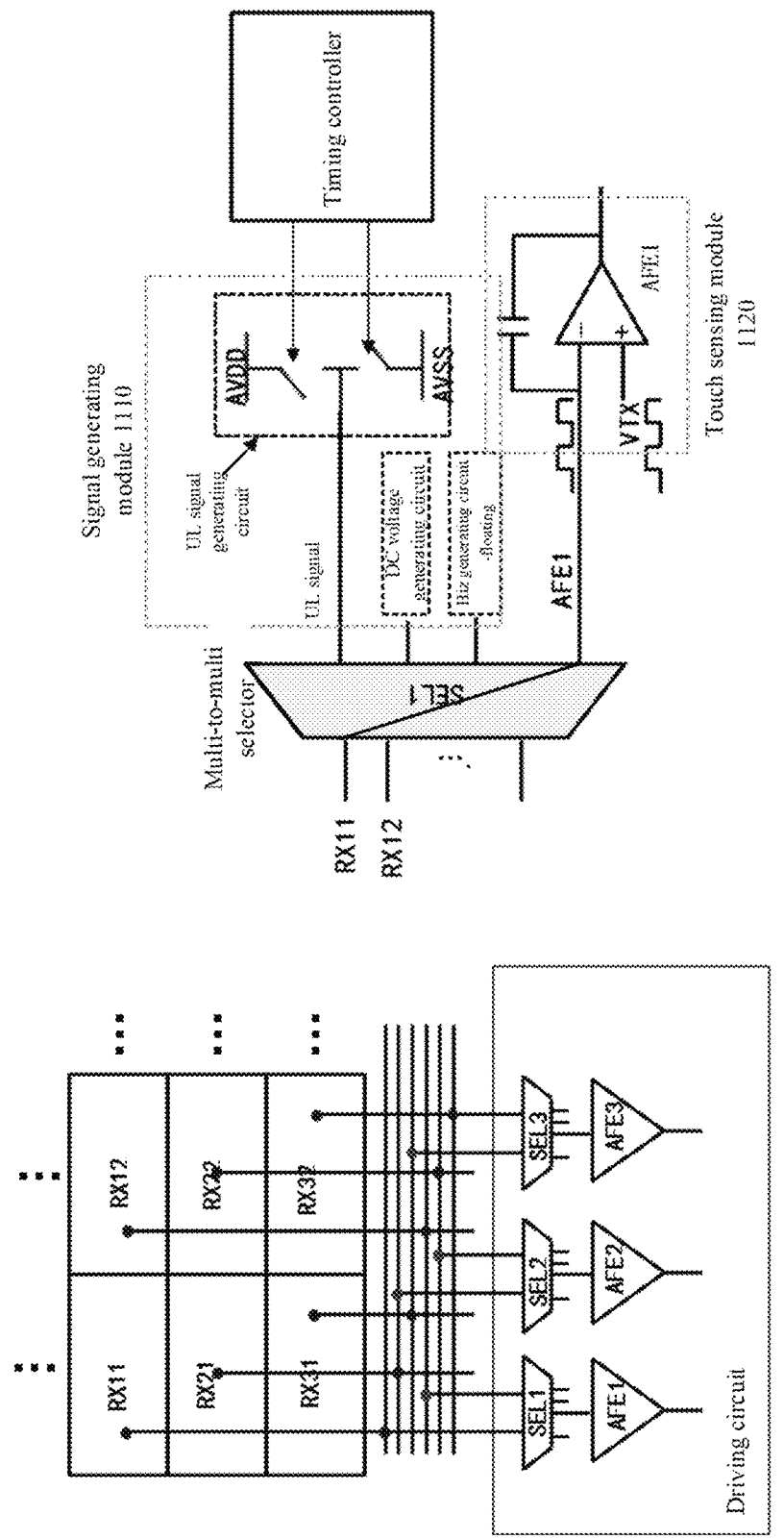
FIGS. 13A-13D respectively illustrate connection manners in which the selection module of the driving circuit shown in FIG. 12 connects the touch sensing electrodes to the signal generating module and the touch sensing module at different time periods.

As shown in FIG. 13A, taking the situation in which the touch detection is performed column-by-column as an example, during a touch detection period (during each touch detection period, touch detection for a part of the touch sensing electrodes (for example, the touch sensing electrodes of some columns in FIG. 13A) may be completed), the multiple-to-multiple selector SEL1 may connect the first touch sensing electrode RX11 of the first row to the analog front end AFE1 in the touch sensing module connected to the multiple-to-multiple selector SEL1, such that the analog front end AFE1 may transmit the touch excitation signal to the touch sensing electrode RX11 and receive the sensed signal therefrom. At the same time, although not shown, each of the remaining multiple-to-multiple selectors (e.g., SEL2, SEL3 . . . ) also connects the first touch sensing electrode (e.g., RX21, RX31 . . . ) of its corresponding row to its corresponding analog front end (e.g., AFE2, AFE3 . . . ) correspondingly. In this way, the N analog front ends may simultaneously receive N sensed signals for the N touch sensing electrodes.

Next, the multiple-to-multiple selector SEL1 continues to connect the second touch sensing electrode RX12 of the first row to the analog front end AFE1. At the same time, each of the remaining multiple-to-multiple selectors (e.g., SEL2, SEL3, . . . ) also connects the second touch sensing electrode (e.g., RX22, RX32 . . . ) of its corresponding rows with its corresponding analog front ends (e.g., AFE2, AFE3 . . . ) correspondingly, and so on.

Figure 13B:
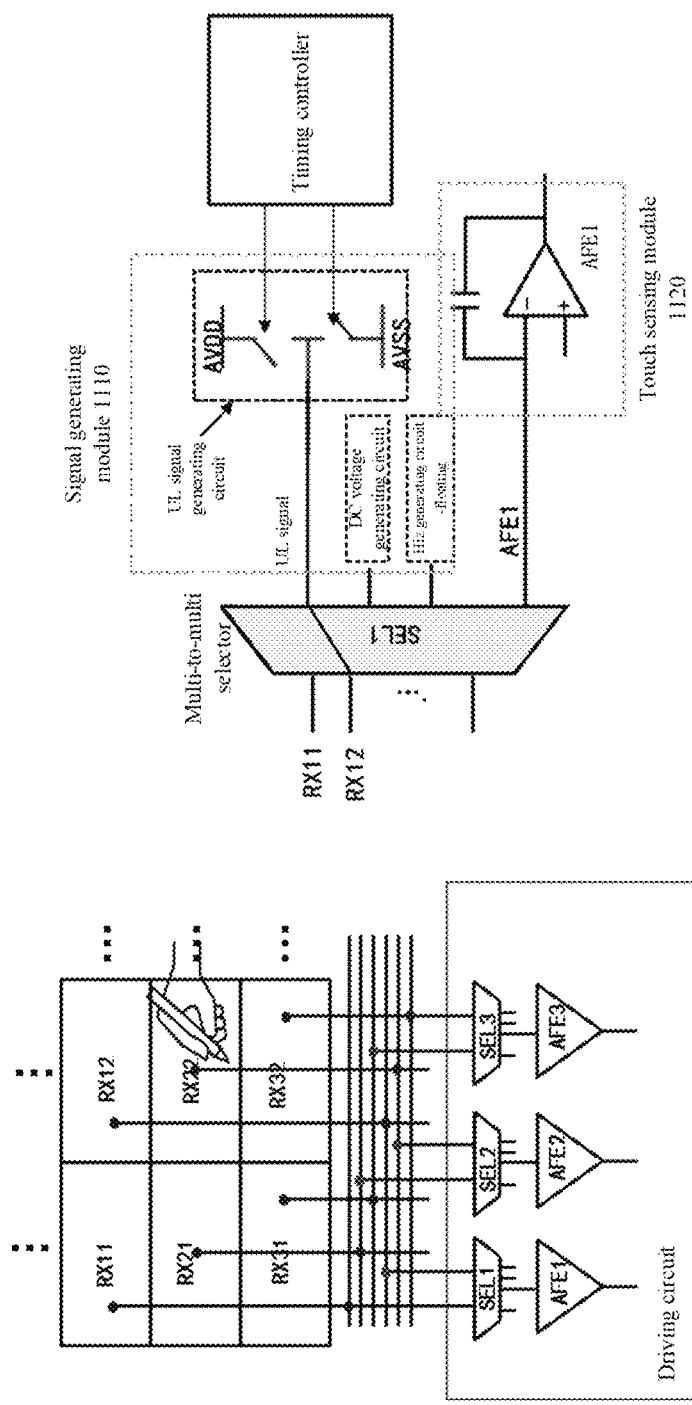

As shown in FIG. 13B, assuming it's determined that the touch position of the active stylus is the touch sensing electrode RX22, during the UL transmission period, the multiple-to-multiple selector SEL1 may connect the touch sensing electrode RX22 with the UL signal generating circuit, so as to transmit the UL signal to the touch sensing electrode RX22. Meanwhile, it may be necessary to transmit the UL signal to the touch sensing electrodes (RX12, RX32, and so on) on the same column as the touch sensing electrode RX22 or the touch sensing electrodes on the adjacent columns (for example, the touch sensing electrodes included in the first region or the other regions except for the first region and the at least a part of the region including the second region as described above), and for these touch sensing electrodes, they are also connected to the UL signal generating circuit. FIG. 13B shows that the touch sensing electrode RX12 in the same column as the touch sensing electrode RX22 is connected to the UL signal generating circuit. The touch sensing electrode RX11 on the column adjacent to the column where RX22 is located may also be connected to the UL signal generating circuit to receive the UL signal.

Meanwhile, for the remaining touch sensing electrodes to which the UL signal is not necessary to be transmitted, multiple-to-multiple selectors corresponding thereto would also connect them with the DC voltage generating circuit or the floating node during the UL transmission period.

Figure 13C:
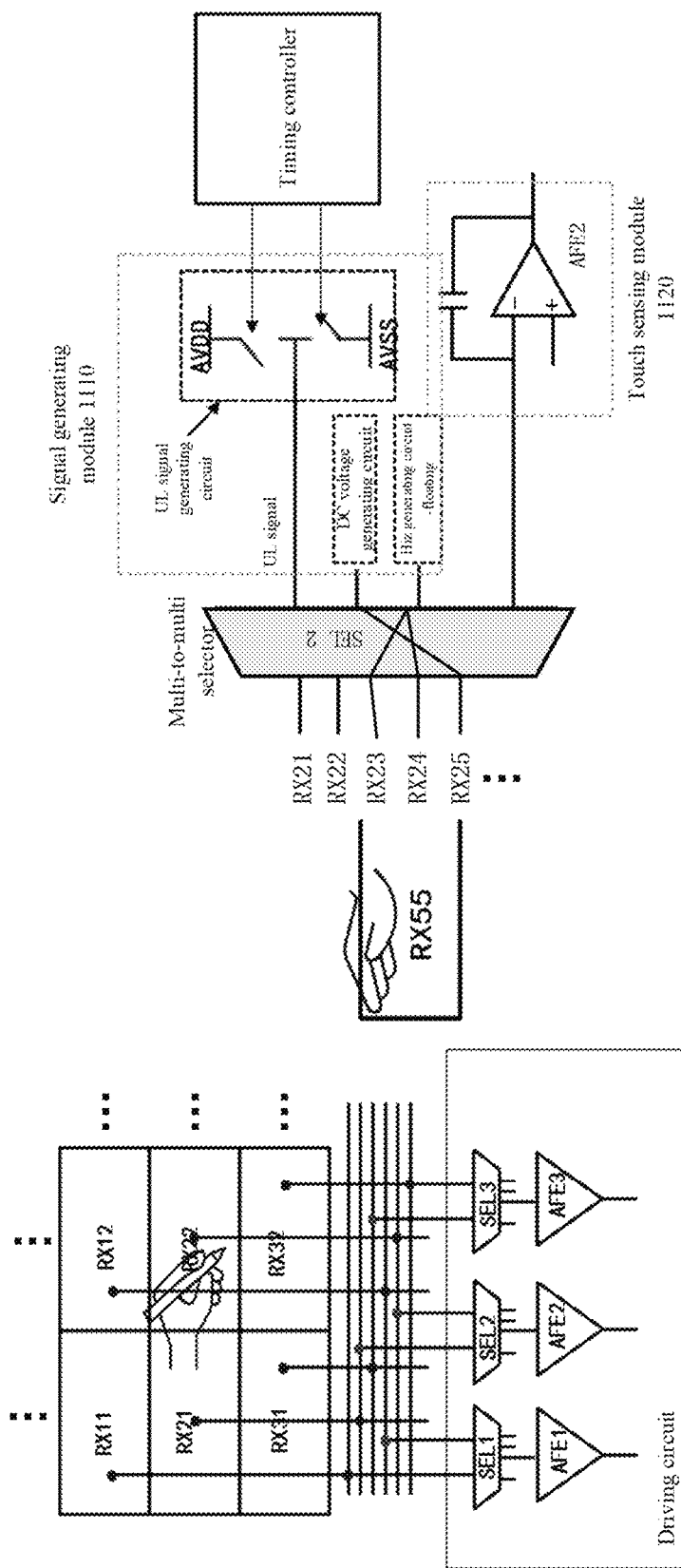

As shown in FIG. 13C, assuming it's determined that the touch position of the active stylus is the touch sensing electrode RX22 and the touch position of human body (for example, the palm) is RX55, the region corresponding to the touch sensing electrodes on column 2 may be determined as the first region, and the region corresponding to the touch sensing electrodes on column 5 may be determined as the second region. Since the distance between the two regions is relatively close, a buffer region (for example, including two columns of touch sensing electrodes (columns 3 and 4)) may be set. In this way, during the UL transmission period, the UL signal is transmitted to the touch sensing electrodes on column 2, the DC voltage signal (anti-interference signal) is transmitted to the touch sensing electrodes on the column 5, and the buffer signal (HiZ) is transmitted to the touch sensing electrodes on columns 3 and 4. In FIG. 13C, a row of touch sensing electrodes RX21, RX22, RX23, RX24, RX25 . . . are illustrated, so the multiple-to-multiple selector SEL2 connects the touch sensing electrodes RX22 on the column 2 with the UL signal generating circuit, connects the touch sensing electrodes RX23 and RX24 on columns 3 to 4 to the floating node, and connects the touch sensing electrode RX25 on the column 5 to the DC voltage generating circuit. For the touch sensing electrodes on the remaining columns, the UL signal or anti-interference signal may be transmitted thereto, and they may be connected to corresponding circuits in the signal generating module through the multiple-to-multiple selectors correspondingly.

Figure 13D:
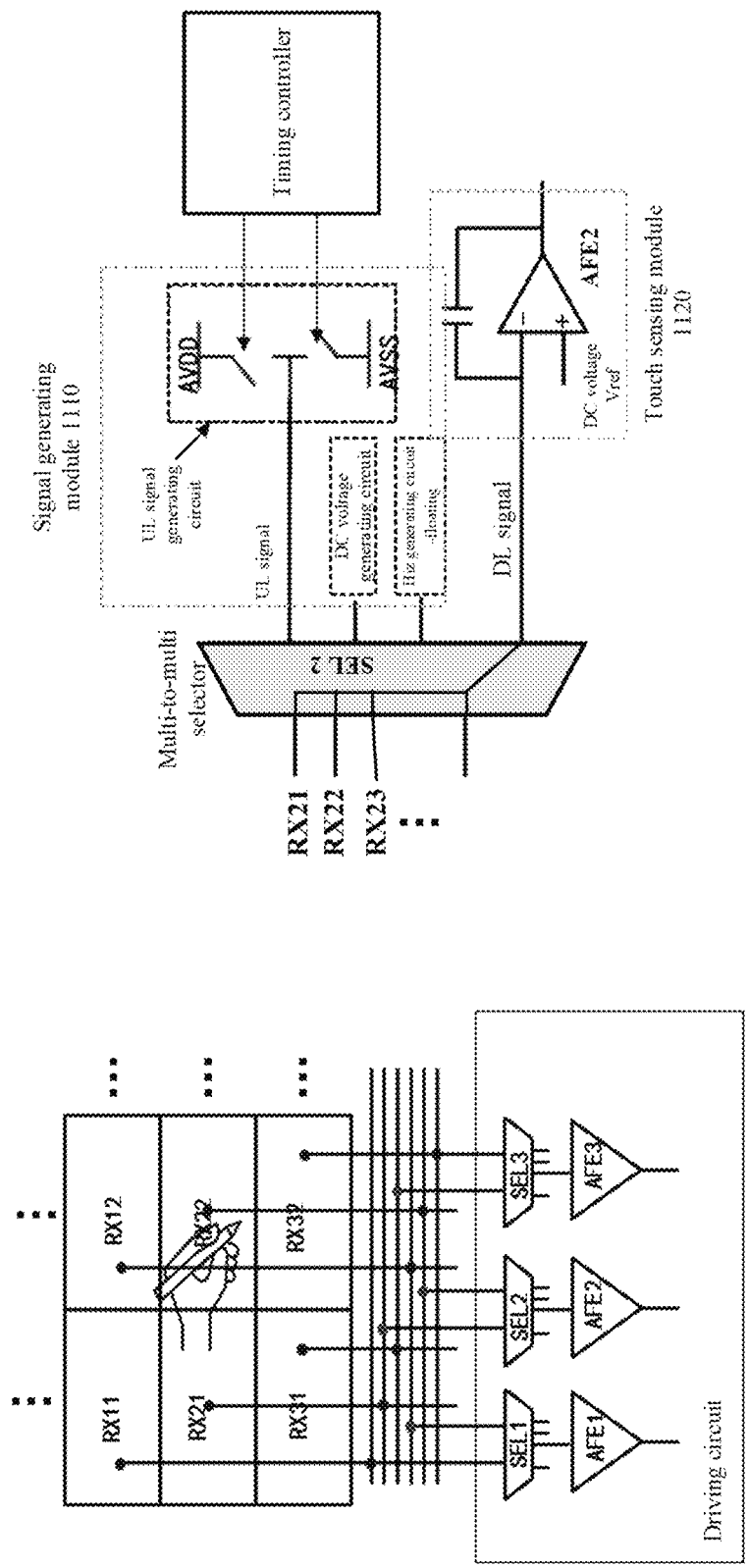

As shown in FIG. 13D, during the DL transmission period of the active stylus, each multiple-to-multiple selector may connect (short-circuit) touch sensing electrodes on the same row corresponding to the multiple-to-multiple selector, which is shown as connecting the touch sensing electrodes RX21, RX22 . . . on the second row and then connecting them to the second terminal of the analog front end AFE2 corresponding to the multiple-to-multiple selector SEL2, and the first terminal of the AFE2 is connected to the DC voltage Vref. The DL signal (if applicable) is received through the analog front end.

According to yet another aspect of the present disclosure, a touch display device is also provided. The touch display device may be the touch display device shown in FIG. 2, which may include: a touch display panel including a plurality of touch sensing electrodes, which are used to perform touch sensing during a touch detection period, transmit an UL signal to an active stylus during a uplink (UL) transmission period, and receive a DL signal from the active stylus during a downlink (DL) transmission period of the active stylus; and the drive circuit as described with reference to FIGS. 11-13D.

Alternatively, the display panel and the touch sensor in the touch display panel may be arranged in an on-cell or in-cell manner.

Examples of the touch display device may be mobile devices, personal computers, tablet computers, personal digital assistants, etc., which are not limited in the present disclosure.

It will be apparent to those skilled in the art that various modifications and changes may be made in the structure of the disclosed embodiments without departing from the scope or spirit of the present disclosure. In view of the foregoing, this disclosure is intended to cover modifications and variations of this disclosure that fall within the scope of the appended claims and their equivalents.

What is claimed is:

1. A driving method of a touch display panel including a plurality of touch sensing electrodes, comprising:
obtaining a touch position of an active stylus;
determining a first region on the touch display panel based on the touch position of the active stylus; and
transmitting an uplink (UL) signal to touch sensing electrodes in the first region and transmitting an anti-interference signal to touch sensing electrodes in a second region on the touch display panel which is different from the first region, during an UL transmission period, wherein the UL signal transmitted to the touch sensing electrodes in the first region during the UL transmission period is for transmission to the active stylus; and wherein the method further comprises:

during the UL transmission period, transmitting a buffer signal which is different from the uplink (UL) signal and the anti-interference signal to touch sensing electrodes in a third region which is adjacent to the first region and is positioned between the first region and the second region.

2. The driving method of claim 1, wherein the determining of the first region on the touch display panel based on the touch position of the active stylus comprising:

determining, a region corresponding to all touch sensing electrodes on a column where the touch position of the active stylus is located and on a first preset number of adjacent columns, as the first region; or determining a touch range and/or movement speed of the active stylus based on at least one touch position of the active stylus within a previous predetermined period, and determining the first region based on the touch range and/or movement speed of the active stylus.

3. The driving method of claim 1, further comprising:
obtaining a touch position of human body;
determining the second region based on the touch position of human body; and
during the UL transmission period, transmitting the UL signal to touch sensing electrodes in a fourth region on the touch display panel and different from the first region, the second region and the third region.

4. The driving method of claim 3, wherein the second region includes a region corresponding to all touch sensing electrodes on a column where the touch position of human body is located, or the second region includes a region corresponding to all touch sensing electrodes on the second region includes a region corresponding to all touch sensing electrodes on the column where the touch position of human body is located and on a second preset number of adjacent columns.

5. The driving method of claim 1, wherein the anti-interference signal transmitted to the touch sensing electrodes in the second region comprises:

a DC voltage signal; or
a high-impedance signal; or
a signal with an amplitude smaller than the UL signal.

6. The driving method of claim 1, wherein the buffer signal comprises a high-impedance signal or a signal with an amplitude smaller than the UL signal, and the driving method further comprises:

determining a region corresponding to touch sensing electrodes on a third preset number of columns adjacent to the first region as the third region.

7. The driving method of claim 6, further comprising:
obtaining a touch position of human body;
determining a distance between the touch position of the active stylus and the touch position of human body is located;

wherein, the step of determining a region corresponding to touch sensing electrodes on a third preset number of columns adjacent to the first region as the third region is performed in response to the distance being within a threshold range.

8. The driving method of claim 1, further comprising:
obtaining a downlink (DL) signal from the active stylus during a DL transmission period of the active stylus, wherein the DL signal carries DL information and is used to detect the touch position of the active stylus, and detecting a touch position of human body during a touch detection period, wherein each touch detection period and each DL transmission period do not overlap in time.

9. The driving method of claim 3, wherein the obtained touch position of the active stylus and/or touch position of human body is a previously detected touch position of the active stylus and/or touch position of human body that is temporally closest to current time.

10. A driving method of a touch display panel including a plurality of touch sensing electrodes, comprising:
obtaining a touch position of human body;
determining a touch region of the human body on the touch display panel based on the touch position of human body; and
during an uplink (UL) transmission period, transmitting a UL signal to touch sensing electrodes in the touch region of the human body and transmitting an anti-interference signal to touch sensing electrodes in at least a part of the region except for the touch region of the human body on the touch display panel, wherein the UL signal transmitted to the touch sensing electrodes in the touch region of the human body during the UL transmission period is for transmission to the active stylus through the human body.

11. The driving method of claim 10, wherein the touch region of the human body includes a region corresponding to all touch sensing electrodes on a column where the touch position of human body is located, or the touch region of the human body includes a region corresponding to all touch sensing the touch region of the human body includes a region corresponding to all touch sensing electrodes on the column where the touch position of human body is located and on a second preset number of adjacent columns.

12. The driving method of claim 10, further comprising:
obtaining a touch position of the active stylus;
determining a first region based on the touch position of the active stylus, wherein the at least a part of the region include the first region, and wherein the first region includes a region corresponding to touch sensing electrodes on a plurality of columns.

13. The driving method of claim 10, wherein the anti-interference signal includes:
a DC voltage signal; or
a high-impedance signal; or
a signal with an amplitude smaller than the UL signal.

14. A driving circuit of a touch display panel including a plurality of touch sensing electrodes, comprising:
a signal generating module, configured to generate an uplink (UL) signal and an anti-interference signal, wherein the UL signal or the anti-interference signal is selectively transmitted to each of the plurality of touch sensing electrodes during an uplink (UL) transmission period;
a touch sensing module, configured to receive a downlink (DL) signal from the plurality of touch sensing electrodes during a DL transmission period of an active stylus, wherein the DL signal is used to determine a touch position of the active stylus; and
a control module configured to
obtain the touch position of the active stylus;
determine a first region on the touch display panel based on the touch position of the active stylus; and during the UL transmission period, perform control such that the UL signal is transmitted to touch sensing electrodes in the first region and the anti-interference signal is transmitted to touch sensing electrodes in a second region which is different from the first region on the touch display panel, wherein the UL signal transmitted to the touch sensing electrodes in the first region during the UL transmission period is for transmission to the active stylus, wherein, the signal generation module is further configured to generate a buffer signal to be selectively transmitted to each of the plurality of touch sensing electrodes during the UL transmission period, the buffer signal being different from the uplink (UL) signal and the anti-interference signal, and the control module is further configured to:
during the UL transmission period, transmit the buffer signal to touch sensing electrodes in a third region which is adjacent to the first region and is positioned between the first region and the second region.

15. The driving circuit of claim 14, wherein the touch sensing module is further configured to:
during a touch detection period, transmit a touch excitation signal to the plurality of touch sensing electrodes, and receive sensed signals therefrom, wherein the sensed signals are used to determine a touch position of human body, and wherein the control module is further configured to:
obtain the touch position of human body;
determine the second region based on the touch position of human body; and
during the UL transmission period, perform control such that the UL signal is transmitted to touch sensing electrodes in a fourth region on the touch display panel and different from the first region, the second region and the third region.

16. The driving circuit of claim 15, wherein the second region includes a region corresponding to all touch sensing electrodes on a column where the touch position of human body is located, or
the second region includes a region corresponding to all touch sensing electrodes on the second region includes a region corresponding to all touch sensing electrodes on the column where the touch position of human body is located and on a second preset number of adjacent columns.

17. The driving circuit of claim 14, wherein the anti-interference signal transmitted to the touch sensing electrodes in the second region comprises:
a DC voltage signal; or
a high-impedance signal; or
a signal with an amplitude smaller than the UL signal.

18. The driving circuit of claim 14, wherein the buffer signal comprises a high-impedance signal or a signal with an amplitude smaller than the UL signal, and
the control module is further configured to:
determine a region corresponding to touch sensing electrodes on a third preset number of columns adjacent to the first region as the third region.

19. The driving circuit of claim 18, wherein
the control module is further configured to:
obtain a touch position of human body; and
determine a distance between the touch position of the active stylus and the touch position of human body;
wherein, the control module determines the third region in response to the distance being within a threshold range.

20. The driving circuit of claim 15, wherein the obtained touch position of the active stylus and/or touch position of human body is a previously detected touch position of the active stylus and/or touch position of human body that is temporally closest to current time.

21. A driving circuit of a touch display panel including a plurality of touch sensing electrodes, comprising:
a signal generating module, configured to generate an uplink (UL) signal, an anti-interference signal and a touch excitation signal;
a touch sensing module, configured to, during a touch detection period, transmit the touch excitation signal to the plurality of touch sensing electrodes and receive sensed signals therefrom, wherein the sensed signals are used to determine a touch position of human body; and
a control module configured to:
obtain the touch position of human body;
determine a touch region of the human body on the touch display panel based on the touch position of human body; and
during an UL transmission period, perform control such that an uplink (UL) signal is transmitted to touch sensing electrodes in the touch region of the human body and an anti-interference signal is transmitted to touch sensing electrodes in at least a part of the region except for the touch region of the human body on the touch display panel,
wherein the UL signal transmitted to the touch sensing electrodes in the touch region of the human body during the UL transmission period is for transmission to the active stylus through the human body.

22. The driving circuit of claim 21, wherein the touch region of the human body includes a region corresponding to all touch sensing electrodes on a column where the touch position of human body is located, or
the touch region of the human body includes a region corresponding to all touch sensing the touch region of the human body includes a region corresponding to all touch sensing electrodes on the column where the touch position of human body is located and on a second preset number of adjacent columns.

23. The driving circuit of claim 21, wherein the control module is further configured to:
obtain a touch position of the active stylus;
determine a first region based on the touch position of the active stylus, wherein the at least a part of the region include the first region, and wherein the first region includes a region corresponding to touch sensing electrodes on a plurality of columns.

24. The driving circuit of claim 21, wherein the anti-interference signal comprises:
a DC voltage signal; or
a high-impedance signal; or
a signal with an amplitude smaller than the UL signal.

25. A touch display device comprises:
a touch display panel including a plurality of touch sensing electrodes, wherein the plurality of touch sensing electrodes are used to perform touch sensing during a touch detection period, to transmit a uplink (UL) signal to an active stylus during an UL transmission period and receive a downlink (DL) signal from the active stylus during a DL period; and
a driving circuit as claimed in claim 14.

* * * * *

UNITED STATES PATENT AND TRADEMARK OFFICE
CERTIFICATE OF CORRECTION

PATENT NO.         : 11,822,745 B2
APPLICATION NO.    : 17/891628
DATED              : November 21, 2023
INVENTOR(S)        : Hao-Wei Cheng et al.

Page 1 of 1

It is certified that error appears in the above-identified patent and that said Letters Patent is hereby corrected as shown below:

In the Claims

At Column 27, Line 40, "the second region includes a region corresponding to all touch sensing electrodes on the second region includes a region corresponding to all touch sensing electrodes on" should be -- the second region includes a region corresponding to all touch sensing electrodes on --.

At Column 28, Line 37, "the touch region of the human body includes a region corresponding to all touch sensing the touch region of the human body includes a region corresponding to all touch sensing" should be -- the touch region of the human body includes a region corresponding to all touch sensing --.

Signed and Sealed this
Twenty-fifth Day of June, 2024

Katherine Kelly Vidal
*Director of the United States Patent and Trademark Office*